United States Patent [19]
Hotta et al.

[11] Patent Number: 5,653,212
[45] Date of Patent: Aug. 5, 1997

[54] EXHAUST GAS RECIRCULATION SYSTEM

[75] Inventors: Minoru Hotta, Nagoya; Yoshinori Maegawa, Oobu; Masahiko Tajima, Takahama, all of Japan

[73] Assignee: Nippondenso Co., Ltd., Kariya, Japan

[21] Appl. No.: 561,911

[22] Filed: Nov. 22, 1995

[30] Foreign Application Priority Data

| Nov. 24, 1994 | [JP] | Japan | 6-289369 |
| Nov. 24, 1994 | [JP] | Japan | 6-289346 |
| Nov. 24, 1994 | [JP] | Japan | 6-289417 |
| Dec. 5, 1994 | [JP] | Japan | 6-300047 |

[51] Int. Cl.$^6$ .......................... F02M 25/07; F02M 23/04
[52] U.S. Cl. .......................... 123/571; 123/585; 73/117.3
[58] Field of Search .......................... 123/568, 569, 123/571; 73/117.3

[56] References Cited

U.S. PATENT DOCUMENTS

| 4,715,348 | 12/1987 | Kobayashi et al. | 123/571 |
| 5,137,004 | 8/1992 | Takahata et al. | 123/571 |
| 5,154,156 | 10/1992 | Ohuchi | 123/571 |
| 5,341,300 | 8/1994 | Fujimoto | 123/571 |
| 5,368,005 | 11/1994 | Kako | 123/571 |
| 5,474,051 | 12/1995 | Matsumoto et al. | 123/571 |
| 5,508,926 | 4/1996 | Wade | 123/571 |
| 5,513,616 | 5/1996 | Matsumoto et al. | 123/571 |
| 5,540,091 | 7/1996 | Nakagawa | 123/571 |

FOREIGN PATENT DOCUMENTS

| 62-051746 | 3/1987 | Japan . |
| 5-231245 | 9/1993 | Japan . |

*Primary Examiner*—Willis R. Wolfe
*Attorney, Agent, or Firm*—Cushman, Darby & Cushman IP Group of Pillsbury Madison & Sutro, LLP

[57] ABSTRACT

An open/close means M1 opens or closes an EGR passage. An engine load detecting means M2 detects an engine load, such as an intake air amount or an intake air pressure. Either an open. condition or a closed condition of the open/close means M1 is specified as a referential state, while the other is specified as a non-referential state. A memory means M3 memorizes engine loads at the referential state and the non-referential state. A constant acceleration judging means M4 makes a judgement as to whether or not the operational condition of the engine is in a constant accelerating condition. An open/close control means M5 switches the open/close means M1 from the referential state to the non-referential state in response to a constant accelerating condition detected by the constant acceleration judging means M4. An estimating means M8 calculates an estimated engine load to be measured if the open/close means M1 is maintained at the referential state under the continuous constant accelerating condition at the time an actual engine load is detected in the non-referential state, based on a plurality of detection values of the engine load values memorized in the referential state. An abnormality judging means M7 compares the estimated engine load calculated by the estimating means M6 with the actual engine load detected in the non-referential state, thereby making a judgement as to whether the exhaust gas recirculating operation is normal or abnormal.

25 Claims, 26 Drawing Sheets

EXHAUST GAS RECIRCULATION SYSTEM

BACKGROUND OF THE INVENTION

1. Field of the Invention

This invention relates to an exhaust gas recirculation system (EGR) for reducing the amount of NOx contained in exhaust gas of an internal combustion engine equipped, for example, in an automotive vehicle, and more particularly to an exhaust gas recirculation system (hereinafter, referred to as an EGR system) capable of judging the abnormality of the operation of EGR system.

2. Related Art

Malfunction of the EGR system leads to an increase of NOx in exhaust gas. To prevent such an increase of harmful emission, an EGR abnormality judging system having been already developed detects the abnormality of the EGR system and notifies it of the driver by means of an appropriate alarming device. This kind of system, for example disclosed in Unexamined Japanese Patent Application No. 62-51746 published in 1987, controls the open/close state of an EGR valve installed in an exhaust gas recirculation passage to open and close in a repetitive manner (e.g. open→close→open), detects a first intake air amount (or intake air pressure) in a valve-opening condition and a second intake air amount (or intake air pressure) in a valve-closing condition, and compares the difference of the first and second intake air amounts with an abnormality judging value, thereby judging presence of abnormality of the EGR system. This judgement is based on the fact that, irrespective of open/close control of the EGR valve, the change of the intake air amount (or intake air pressure) is small once the EGR valve was damaged.

However, this system has a disadvantage in that it is not so reliable when the EGR rate is low, because the absolute change of intake air amount (or intake air pressure) in such a low-EGR-rate condition is too small to guarantee the accuracy of the abnormality judgement.

SUMMARY OF THE INVENTION

Accordingly, in view of above-described problems encountered in the related art, a principal object of the present invention is to provide an exhaust gas recirculation system having a function of effectively diagnosing the EGR operation thereof and accurately detecting a malfunction of the system without taking a long time for the abnormality judgement, and capable of preventing the emission from getting worse.

In order to accomplish this and other related objects, a first aspect of the present invention provides an exhaust gas recirculation system comprising: open/close means for opening and closing an exhaust gas recirculation passage recirculating a part of exhaust gas of an internal combustion engine from an exhaust passage to an intake passage; intake air amount detecting means (or intake air pressure detecting means) for detecting an amount (or pressure) of intake air introduced into the internal combustion engine; memory means for memorizing intake air amounts (or intake air pressures) at a referential state and a non-referential state of the open/close means based on detection signals obtained from the intake air amount detecting means (or intake air pressure detecting means), the referential state being either an open condition or a closed condition of the open/close means while the non-referential state being the other; constant acceleration judging means for judging whether or not the internal combustion engine is operated in a constant accelerating condition; open/close control means for switching the open/close means from the referential state to the non-referential state when a constant accelerating condition is detected by the constant acceleration judging means; estimating means for calculating an estimated intake air amount (or estimated intake air pressure) to be measured if the open/close means is maintained at the referential state under the constant accelerating condition at a time an actual intake air amount (or actual intake air pressure) is detected in the non-referential state, based on a plurality of detection values of the intake air amounts (or intake air pressures) in the referential state memorized by the memory means; and abnormality judging means for comparing the estimated intake air amount calculated by the estimating means with the actual intake air amount (or actual intake air pressure) detected by the intake air amount detecting means (or intake air pressure detecting means) in the non-referential state, thereby making a judgement as to whether an exhaust gas recirculating operation is normal or abnormal.

In the above first aspect of the present invention, it is preferable that intake air amounts (or intake air pressures) are successively detected by the intake air amount detecting means (or intake air pressure detecting means) and memorized by the memory means, and the constant acceleration judging means repeats a judgement for detecting the constant accelerating condition based on the successively detected intake air amounts (or intake air pressures) until any constant accelerating condition is detected.

Furthermore, it will be desirable to comprise: throttle valve opening detecting means for detecting a throttle valve opening degree of the internal combustion engine every time the intake air amount detecting means (or intake air pressure detecting means) detects an intake air amount (an intake air pressure); and intake air amount correcting means (or intake air pressure correcting means) for correcting the intake air amount (intake air pressure) detected by the intake air amount detecting means (intake air pressure detecting means) in accordance with a resultant change of the throttle valve opening degree detected by the throttle valve opening detecting means, so as to compensate for the resultant change of the throttle valve opening degree.

It will be also preferable that the abnormality judgement by the abnormality judging means is prohibited when the resultant change of the throttle valve opening degree exceeds a predetermined value.

Moreover, there will be provided auxiliary air supply means for supplying auxiliary air into the internal combustion engine through an auxiliary air passage independent of a throttle valve of the internal combustion engine; and abnormality judgement prohibiting means for prohibiting the abnormality judgement by the abnormality judging means when a change amount of the auxiliary air exceeds a predetermined amount. Alternatively, the abnormality judgement prohibiting means can be replaced by restricting means for restricting the auxiliary air supply means from changing a supply amount of auxiliary air when the abnormality judgement means performs the abnormality judgement.

According to the above-described first aspect of the present invention, the open/close means is maintained at the referential state until a constant accelerating condition is recognized. After the constant accelerating condition is surely recognized, the open/close means is switched for the first time to the non-referential state. Thus, the EGR abnormality judgement is performed only when the internal combustion engine 1 is stably operated in a constant accelerating condition, thereby eliminating erroneous judgements and preventing the emission from getting worse. Furthermore, the estimated intake air amount for the referential state is accurately obtained using the interpolation based on the already detected intake air amounts (or intake air pressures). Thus, the abnormality of the EGR system is accurately detectable.

A second aspect of the present invention provides an exhaust gas recirculation system comprising: open/close means for opening and closing an exhaust gas recirculation passage recirculating a part of exhaust gas of an internal combustion engine from an exhaust passage to an intake passage; intake air amount detecting means (or intake air pressure detecting means) for detecting an amount (or pressure) of intake air introduced into the internal combustion engine; throttle valve opening degree detecting means for detecting an opening degree of a throttle valve of the internal combustion engine; memory means for memorizing intake air amounts (or intake air pressures) and throttle valve opening degrees at a referential state and a non-referential state of the open/close means based on detection signals obtained from the intake air amount detecting means (or intake air pressure detecting means) and the throttle valve opening degree detecting means, the referential state being either an open condition or a closed condition of the open/close means while the non-referential state being the other; intake air amount correcting means (or intake air pressure correcting means) for correcting the intake air amount (or intake air pressure) detected by the intake air amount detecting means (or intake air pressure detecting means) in accordance with a resultant change of the throttle valve opening degree detected by the throttle valve opening degree detecting means, so as to compensate for the resultant change of the throttle valve opening degree; estimating means for calculating an estimated intake air amount (or estimated intake air pressure) to be measured if the open/close means is maintained at the referential state under a constant valve opening degree of the throttle valve at a time an actual intake air amount (or actual intake air pressure) is detected in the non-referential state, based on a plurality of detection values of the intake air amounts (or intake air pressures) in the referential state corrected by the intake air amount correcting means (or intake air pressure correcting means); and abnormality judging means for comparing the estimated intake air amount (or estimated intake air pressure) calculated by the estimating means with the intake air amount (or intake air pressure) corrected by the intake air amount correcting means (or intake air pressure correcting means) in the non-referential state, thereby making a judgement as to whether an exhaust gas recirculating operation is normal or abnormal.

According to the above-described second aspect of the present invention, the measured intake air amount (or measured intake air pressure) is corrected based on a resultant change of the throttle valve opening degree. Adopting such correction is useful and effective to provide an enlarged region capable of being regarded as a constant accelerating condition, resulting in earlier completion of the EGR abnormality judgement.

A third aspect of the present invention provides an exhaust gas recirculation system comprising: open/close means for opening and closing an exhaust gas recirculation passage recirculating a part of exhaust gas of an internal combustion engine from an exhaust passage to an intake passage; target opening degree setting means for setting a target opening degree of the open/close means in accordance with operating conditions of the internal combustion engine; open/close control means for adjusting an opening degree of the open/close means in accordance with the target opening degree; intake air amount detecting means (or intake air pressure detecting means) for detecting an amount (or pressure) of intake air introduced into the internal combustion engine; abnormality judging means for making a judgement as to whether an exhaust gas recirculating operation is normal or abnormal based on detection signals of the intake air amount detecting means (or intake air pressure detecting means) by comparing an intake air amount (or intake air pressure) detectable at a referential state of the open/close means with an intake air amount (or intake air pressure) detectable at a non-referential state of the open/close means, the referential state being either an open condition or a closed condition of the open/close means while the non-referential state being the other; and open degree restricting means for restricting an operation of the open/close control means, so as to prevent the opening degree of the open/close means from being reduced during execution of the abnormality judgement by the abnormality judging means.

In the third aspect of the present invention, it is preferable that the open degree restricting means allows the open/close control means to increase the opening degree of the open/close means in accordance with the target opening degree during the abnormality judgement by the abnormality judging means, when the target opening degree setting means renewed the target opening degree to a larger value.

Furthermore, it will be preferable that the open degree restricting means fixes the opening degree of the open/close means at a constant value during the abnormality judgement by the abnormality judging means.

According to the above-described third aspect of the present invention, reduction of the opening degree of the open/close means is restricted during the abnormality judgement no matter how the engine operating condition is changed, so that the abnormality judgement is not erroneously performed (without causing an excessive change of the opening degree of the open/close means during the abnormality judgement). Thus, the EGR abnormality judgement will be accurately performed and the emission can be prevented from getting worse.

A fourth aspect of the present invention provides an exhaust gas recirculation system comprising: auxiliary air supply means for supplying auxiliary air into an internal combustion engine through an auxiliary air passage independent of a throttle valve of the internal combustion engine; open/close means for opening and closing an exhaust gas recirculation passage recirculating a part of exhaust gas of an internal combustion engine from an exhaust passage to an intake passage; intake air amount detecting means (or intake air pressure detecting means) for detecting an amount (or pressure) of intake air introduced into the internal combustion engine through the throttle valve; abnormality judging means for making a judgement as to whether an exhaust gas recirculating operation is normal or abnormal based on detection signals of the intake air amount detecting means (or intake air pressure detecting means) by comparing an intake air amount (or intake air pressure) detectable at a referential state of the open/close means with an intake air amount (or intake air pressure) detectable at a non-referential state of the open/close means, the referential state being either an open condition or a closed condition of the open/close means while the non-reverential state being the other; and abnormality judgement prohibiting means for prohibiting the abnormality judgement by the abnormality judging means when a change amount of the auxiliary air exceeds a predetermined amount.

In the fourth aspect of the present invention, the abnormality judgement prohibiting means can be replaced by restricting means for restricting the auxiliary air supply means from changing a supply amount of auxiliary air when the abnormality judgement means performs the abnormality judgement.

According to the above-described fourth aspect of the present invention, the change of auxiliary air amount is always monitored during the EGR abnormality judgement, so that the EGR abnormality judgement is prohibited when the change of auxiliary air amount is large. Thus, the EGR abnormality judgement is no longer given an adverse effect derived from the change of auxiliary air, and thus can be performed accurately.

Still further, a fifth aspect of the present invention provides an exhaust gas recirculation system comprising: open/close means for opening and closing an exhaust gas recirculation passage recirculating exhaust gas of an internal combustion engine from an exhaust passage to an intake passage; engine load detecting means for detecting an engine load of the internal combustion engine; memory means comprising a referential state memory means and a non-referential state memory means, the referential state memory memorizing an engine load detected by the engine load detecting means when the open/close means is in a referential state while the non-referential state memory memorizing an engine load detected by the engine load detecting means when the open/close means is in a non-referential state, the referential state being either an open condition or a closed condition of the open/close means while the non-referential state being the other; constant acceleration judging means for making a judgement as to whether or not an operational condition of the internal combustion engine is in a constant accelerating condition; open/close control means for switching the open/close means from the referential state to the non-referential state in response to a constant accelerating condition detected by the constant acceleration judging means; estimating means for calculating an estimated engine load to be measured if the open/close means is maintained at the referential state under a continuous constant accelerating condition at a time an actual engine load is detected in the non-referential state, based on a plurality of detection values of the engine load values memorized in the referential state; and abnormality judging means for comparing the estimated engine load calculated by the estimating means with the actual engine load detected in the non-referential state, thereby making a judgement as to whether an exhaust gas recirculating operation is normal or abnormal.

A sixth aspect of the present invention provides an exhaust gas recirculation system comprising: open/close means for opening and closing an exhaust gas recirculation passage recirculating exhaust gas of an internal combustion engine from an exhaust passage to an intake passage; engine load detecting means for detecting an engine load of the internal combustion engine; throttle valve opening detecting means for detecting a valve opening degree of a throttle valve controlling an intake air amount to be introduced into the internal combustion engine; memory means comprising a referential state memory means and a non-referential state memory means, the referential state memory memorizing an engine load detected by the engine load detecting means and a throttle opening degree detected by the throttle valve opening detecting means when the open/close means is in the referential state, while the non-referential state memory memorizing an engine load detected by the engine load detecting mean and a throttle opening degree detected by the throttle valve opening detecting means when the open/close means is in the non-referential state, the referential state being either an open condition or a closed condition of the open/close means while the non-referential state being the other; constant acceleration judging means for making a judgement as to whether or not the operational condition of the internal combustion engine is in a constant accelerating condition; open/close control means for switching the open/close means from the referential state to the non-referential state in response to a constant accelerating condition detected by the constant acceleration judging means; engine load correcting means for correcting the engine load value detected by the engine load detecting means in accordance with a resultant change of the throttle valve opening degree detected by the throttle valve opening detecting means; estimating means for calculating an estimated engine load to be measured if the open/close means is maintained at the referential state under a constant valve opening degree of the throttle valve at a time an actual engine load is detected in the non-referential state, based on a plurality of detection values of the engine load values memorized in the referential state; abnormality judging means for comparing the estimated engine load calculated by the estimating means with a corrected actual engine load which is detected in the non-referential state and corrected in accordance with a resultant change of the throttle valve opening degree, thereby making a judgement as to whether an exhaust gas recirculating operation is normal or abnormal; auxiliary air supply means for supplying auxiliary air so as to increase a total amount of intake air introduced into the combustion chamber of the internal combustion engine; and prohibiting means for prohibiting the abnormality judgement by the abnormality judging means when a supply amount of the auxiliary air is changed.

A seventh aspect of the present invention provides an exhaust gas recirculation system comprising: open/close means for opening and closing an exhaust gas recirculation passage recirculating exhaust gas of an internal combustion engine from an exhaust passage to an intake passage; engine load detecting means for detecting an engine load of the internal combustion engine; throttle valve opening detecting means for detecting a valve opening degree of a throttle valve controlling an intake air amount to be introduced into the internal combustion engine; memory means comprising a referential state memory means and a non-referential state memory means, the referential state memory memorizing an engine load detected by the engine load detecting means and a throttle opening degree detected by the throttle valve opening detecting means when the open/close means is in a referential state, while the non-referential state memory memorizing an engine load detected by the engine load detecting means and a throttle opening degree detected by the throttle valve opening detecting means when the open/close means is in a non-referential state, the referential state being either an open condition or a closed condition of the open/close means while the non-referential state being the other; open/close control means for switching the open/close means from the referential state to the non-referential state; engine load correcting means for correcting the engine load value detected by the engine load detecting means in accordance with a resultant change of the throttle valve opening degree detected by the throttle valve opening detecting means; estimating means for calculating an estimated engine load to be measured if the open/close means is maintained at the referential state under a continuous constant accelerating condition at a time an actual engine load is detected in the non-referential state, based on a plurality of detection values of the engine load values memorized in the referential state; abnormality judging means for comparing the estimated engine load calculated by the estimating means with a corrected actual engine load detected in the non-referential state and corrected in accordance with a resultant change of the throttle valve opening degree, thereby making a judgement as to whether an exhaust gas recirculating operation is normal or abnormal; auxiliary air supply means for supplying auxiliary air so as to change a total air amount introduced into the internal combustion engine; prohibiting means for prohibiting the abnormality judgement by the abnormality judging means when a supply amount of the auxiliary air is changed; open degree adjusting means for determining a target opening degree of the open/close means in accordance with operational conditions of the internal combustion engine; and open degree restricting means for restricting an operation of the open/close control means so as to prevent the opening degree of the open/close means from being excessively changed during execution of an abnormality judgement.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
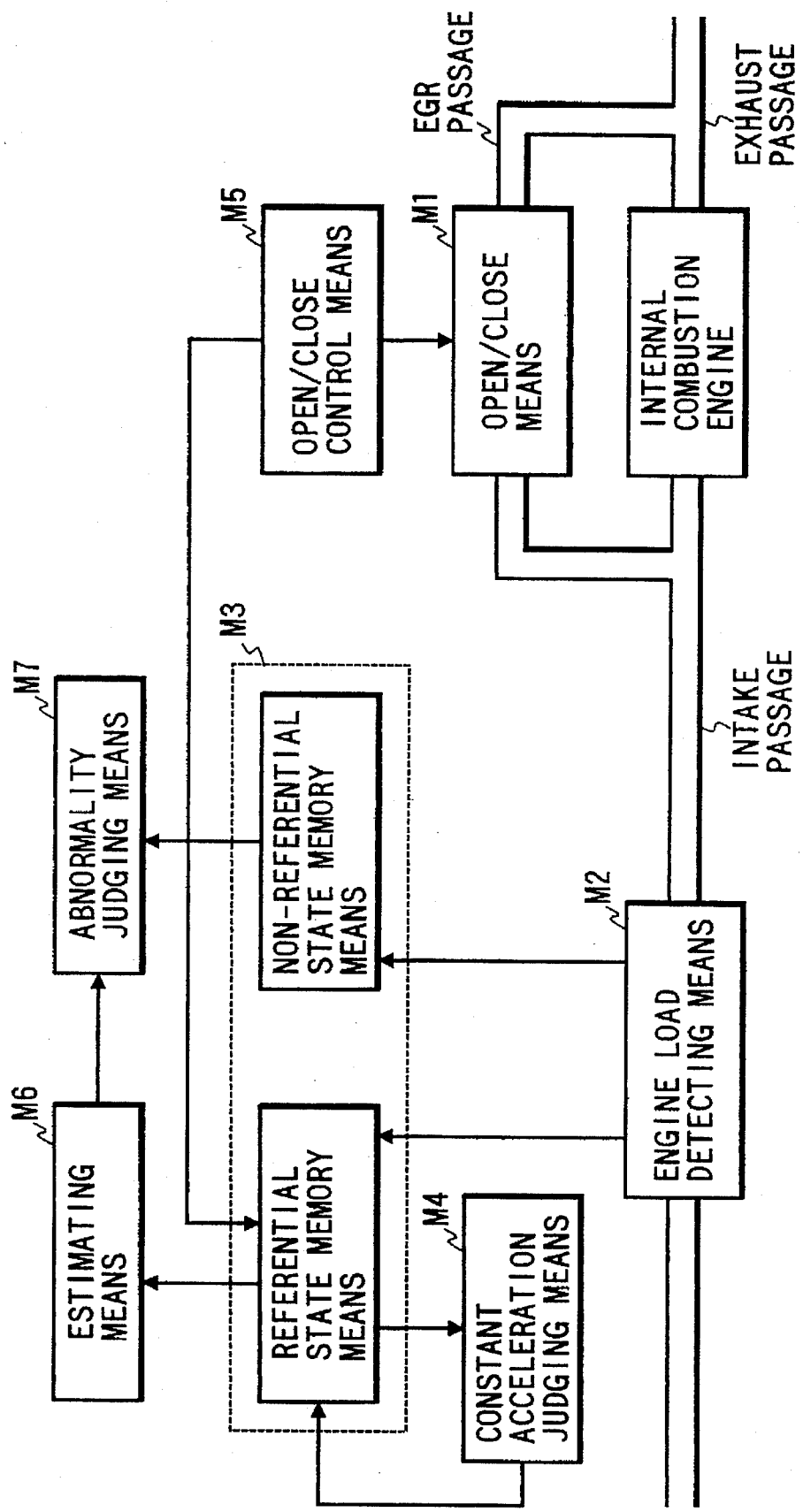
FIG. 1 is a schematic block diagram showing functional blocks constituting an exhaust gas recirculation system in accordance with a first embodiment of the present invention.

Preferred embodiments of the present invention will be explained in greater detail hereinafter, with reference to the accompanying drawings. Identical parts are denoted by identical reference numerals throughout views.

Figure 3:
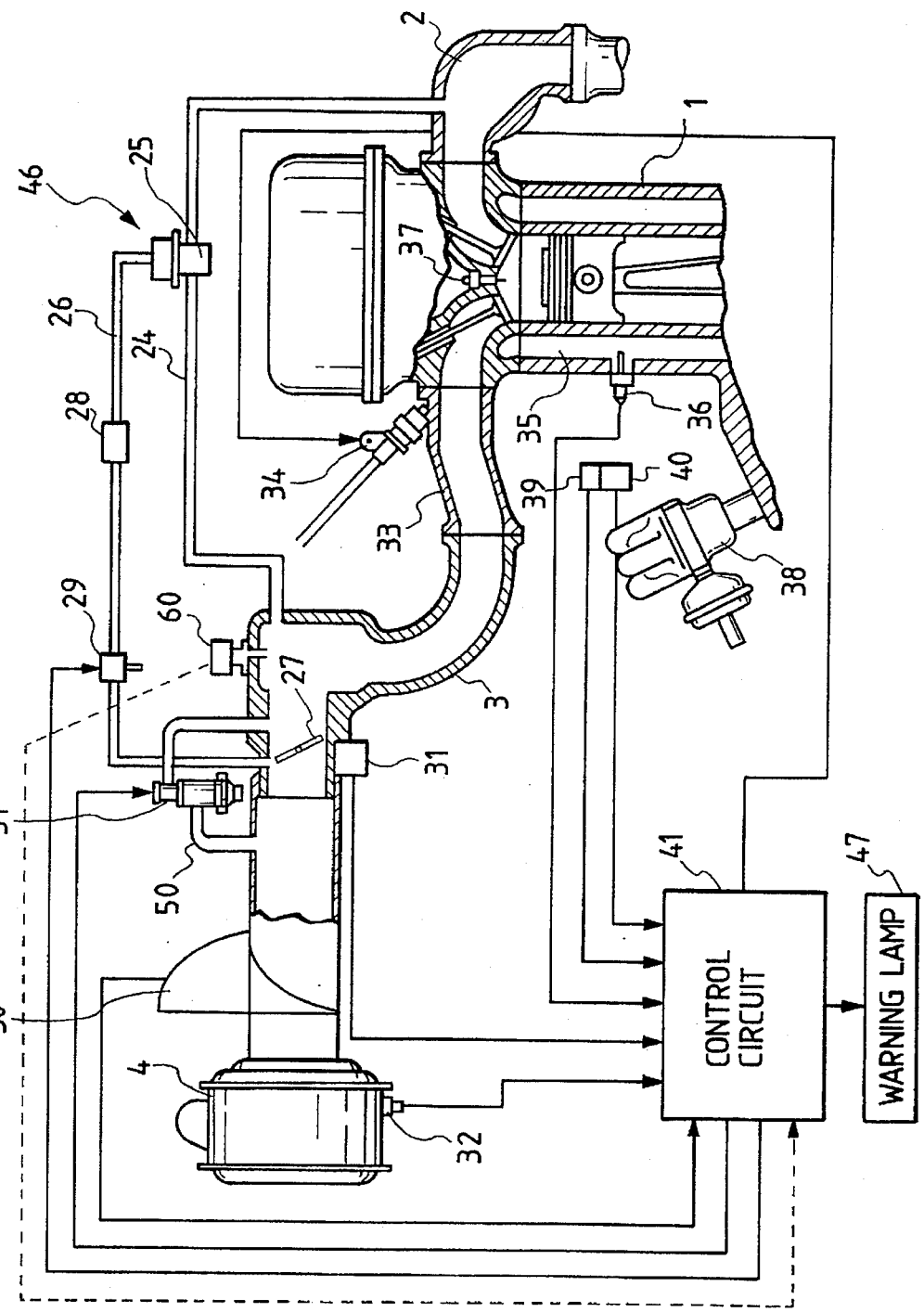
FIG. 3 is a schematic view showing an overall arrangement of the EGR system employed in the internal combustion engine in accordance with the present invention.

FIG. 3 shows an arrangement of an exhaust gas recirculation system applied to an internal combustion engine in accordance with embodiments of the present invention. An internal combustion engine has an exhaust passage 2 and an intake passage 3. An exhaust gas recirculation passage (i.e. EGR passage) 24 is provided between the exhaust passage 2 and the intake passage 3, so as to guide exhaust gas from the exhaust passage 2 to the intake passage 3 (downstream of a throttle valve 27). A vacuum-servo type EGR valve 25, acting as an open/close means M1 of the present invention, is provided in an intermediate portion of the EGR passage 24. A pressure control passage 28 having one end connected to the EGR valve 25 for supplying control pressure to the same and the other end connected to the intake passage 3 in the vicinity of the throttle valve 27. A modulator 28 and an electromagnetic valve 29, cooperatively determining an opening degree of the EGR valve 25, are serially provided in the pressure control passage 26. The electromagnetic valve supplies atmospheric pressure to the modulator 28 when the internal combustion engine 1 is in a cold-start condition, an idle condition, and a high-load condition. On the other hand, the electromagnetic valve 29 supplies negative pressure to the modulator 28 when the internal combustion engine 1 is subjected to the EGR control.

The intake passage 3 is equipped with an air flow meter 30, a throttle valve opening sensor 31, and an intake air temperature sensor 32. The air flow meter 30 serves as an engine load detecting means M2 by detecting an intake air amount passing through an air cleaner 4. The throttle valve opening sensor 31, serving as a throttle valve opening detecting means M8, detects an opening degree of the throttle valve 27. The intake air temperature sensor 32 detects the temperature of intake air. An intake manifold 33, constituting a downstream portion of the intake passage 3, guides intake air flowing in the intake passage 3 to cylinders (combustion chambers) of the internal combustion engine 1. A fuel injector 34 is provided in each branch of the manifold 33, so that injected fuel is effectively atomized in the intake port (i.e. in the vicinity of the internal combustion engine 1) and introduced into the combustion chamber of an associated cylinder through the opened intake valve thereof. There is provided a bypass passage 50 bypassing the throttle valve 27. The bypass passage 50 communicates the downstream portion of the throttle valve 27 with the upstream portion thereof. An idle speed control valve (i.e. ISC valve) 51 is provided in the bypass passage 50. The ISC valve 51, serving as an auxiliary air supply means M10 together with the bypass passage 50, adjusts the amount of bypass air introduced into the combustion chamber through the bypass passage 50 in the engine idling condition, thereby controlling the engine rotational speed for the idle condition. Furthermore, an intake air pressure sensor 60 is provided in the intake passage S at the downstream portion of the throttle valve 27. This intake air pressure sensor 60 can serve, instead of the air flow meter 30, as the engine load detecting means M2 by detecting an intake air pressure in the intake passage 3.

Meanwhile, the internal combustion engine 1 has a water jacket 35 in which cooling water circulates. A cooling water temperature 36 is provided in the water jacket 35 to detect the temperature of cooling water. A distributer 38, applying a high electric voltage to an ignition plug 37, is equipped with a crank angle sensor 39 and a reference angle sensor 40. The crank angle sensor 39 generates an engine speed signal Ne in response to each 30° CA rotation of a crank shaft. The reference angle sensor 40, having a function of detecting a crank angle reference position of a specific cylinder, generates a reference signal of one pulse per two rotations the crank shaft.

On the basis of output signals obtained from the above-described sensors, a control circuit 41 performs various engine controls including an EGR control, and judges the presence of abnormality of the EGR system 46 using the EGR abnormality judging routine shown in the following embodiments of the present invention. When the abnormality of the EGR system 46 is detected, a warning lamp 47 notifies it of a driver. The control circuit 41, chiefly constituted by a micro computer, comprises a CPU performing various arithmetic operations, a ROM memorizing various programs including the EGR abnormality judging routine shown in the attached drawings, and a RAM memorizing various detection data including detected values of the intake air amount and the throttle opening degree. More specifically, the CPU serves as a constant acceleration judging means M4, an open/close control means M5, an estimating means M6, an abnormality judging means M7, an engine load correcting means M9, a prohibiting means M11, an open degree adjusting means M12 and an open degree restricting means M13 in the embodiments of the present invention, while the RAM serves as a memory means M3.

First Embodiment

FIG. 1 shows a schematic arrangement of an exhaust gas recirculation system in accordance with the first embodiment of the present invention. An open/close means M1 opens or closes an exhaust gas recirculation passage recirculating exhaust gas of an internal combustion engine from an exhaust passage to an intake passage. An engine load detecting means M2 detects an engine load, such as an intake air amount or an intake air pressure, of the internal combustion engine. A memory means M3 comprises a referential state memory means and a non-referential state memory means. Either the open condition or closed condition of the open/close means M1 is specified as a referential state, while the other is specified as a non-referential state. The referential state memory memorizes an engine load detected by the engine load detecting means M3 when the open/close means M1 is in the referential state. Meanwhile, the non-referential state memory memorizes an engine load detected by the engine load detecting means M2 when the open/close means M1 is in the non-referential state.

A constant acceleration judging means M4 makes a judgement as to whether or not the operational condition of the internal combustion engine is in a constant accelerating condition. An open/close control means M5 switches the open/close means M1 from the referential state to the non-referential state in response to the constant accelerating condition detected by the constant acceleration judging means M4. An estimating means M6 calculates an estimated engine load to be measured if the open/close means M1 is maintained at the referential state under the continuous constant accelerating condition at the time an actual engine load is detected in the non-referential state, based on a plurality of detection values of the engine load values memorized in the referential state.

An abnormality judging means M7 compares the estimated engine load calculated by the estimating means M6 with the actual engine load detected in the non-referential state, thereby making a judgement as to whether the exhaust gas recirculating operation is normal or abnormal.

Figure 4:
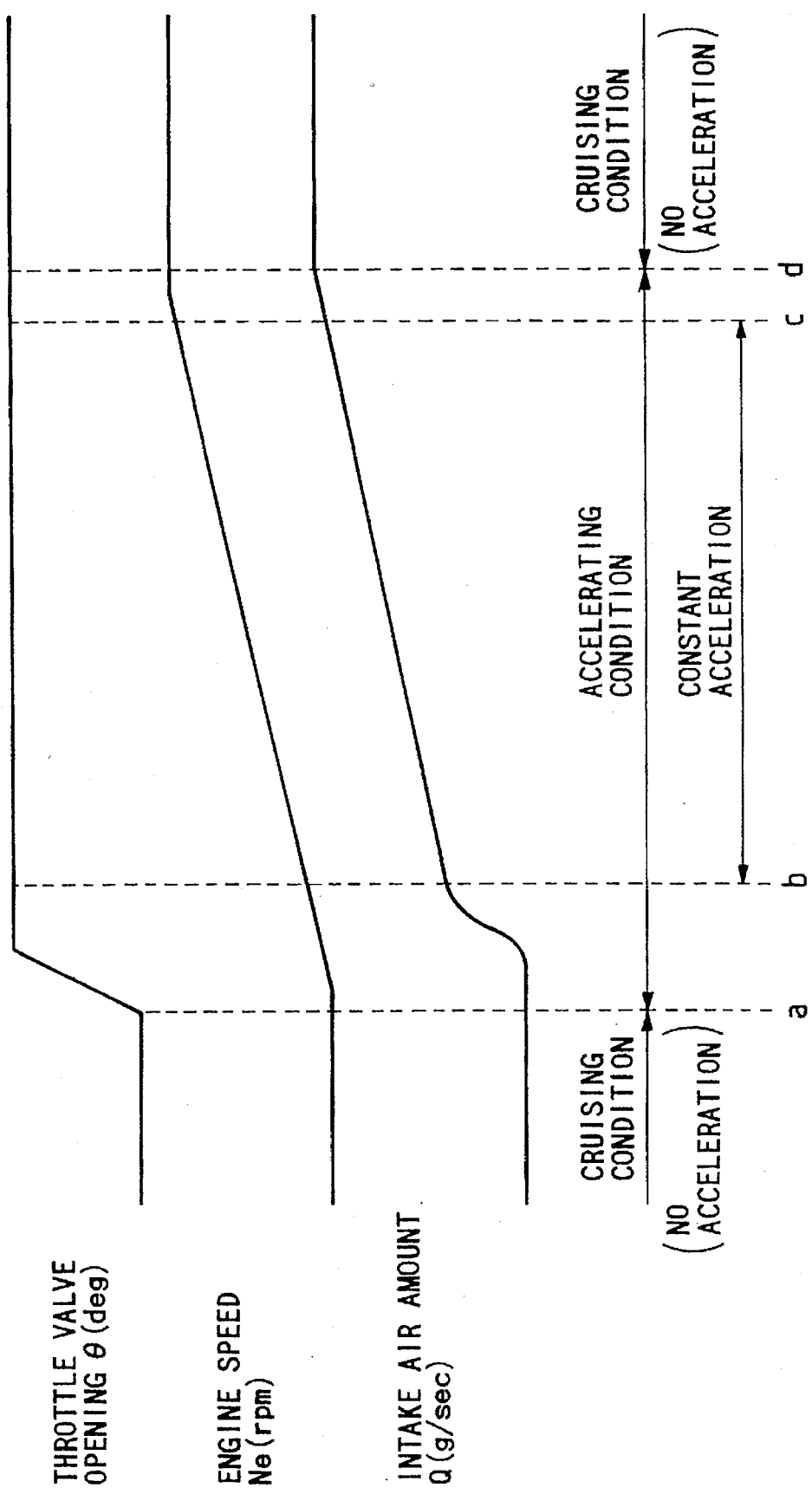
FIG. 4 is a time chart showing changes of operational condition in an accelerating condition of the internal combustion.

In general, if the automotive vehicle is accelerated in response to an increase of the throttle opening degree θ, the engine speed Ne and the air intake amount Q (per unit time) will cause the changes shown in FIG. 4. For example, it is assumed that, after a constant-speed cruising of an automotive vehicle, the throttle valve opening degree θ is increased at the time "a". The intake air amount Q shows a steep increase for a moment immediately after the increase of the throttle valve opening degree θ, the increase of the intake air amount Q being then changed into a constant and stationary increase. In accordance with this acceleration, the engine speed Ne increases and also the vehicle speed increases correspondingly. Subsequently, the torque generated by the internal combustion engine 1 will be increased so that it is equalized with the running resistance of the automotive vehicle at the time "d". After reaching such an equilibrium condition, the engine speed Ne and the intake air amount Q are converged at constant values, with the automotive vehicle again cruising at a constant speed.

Figure 2:
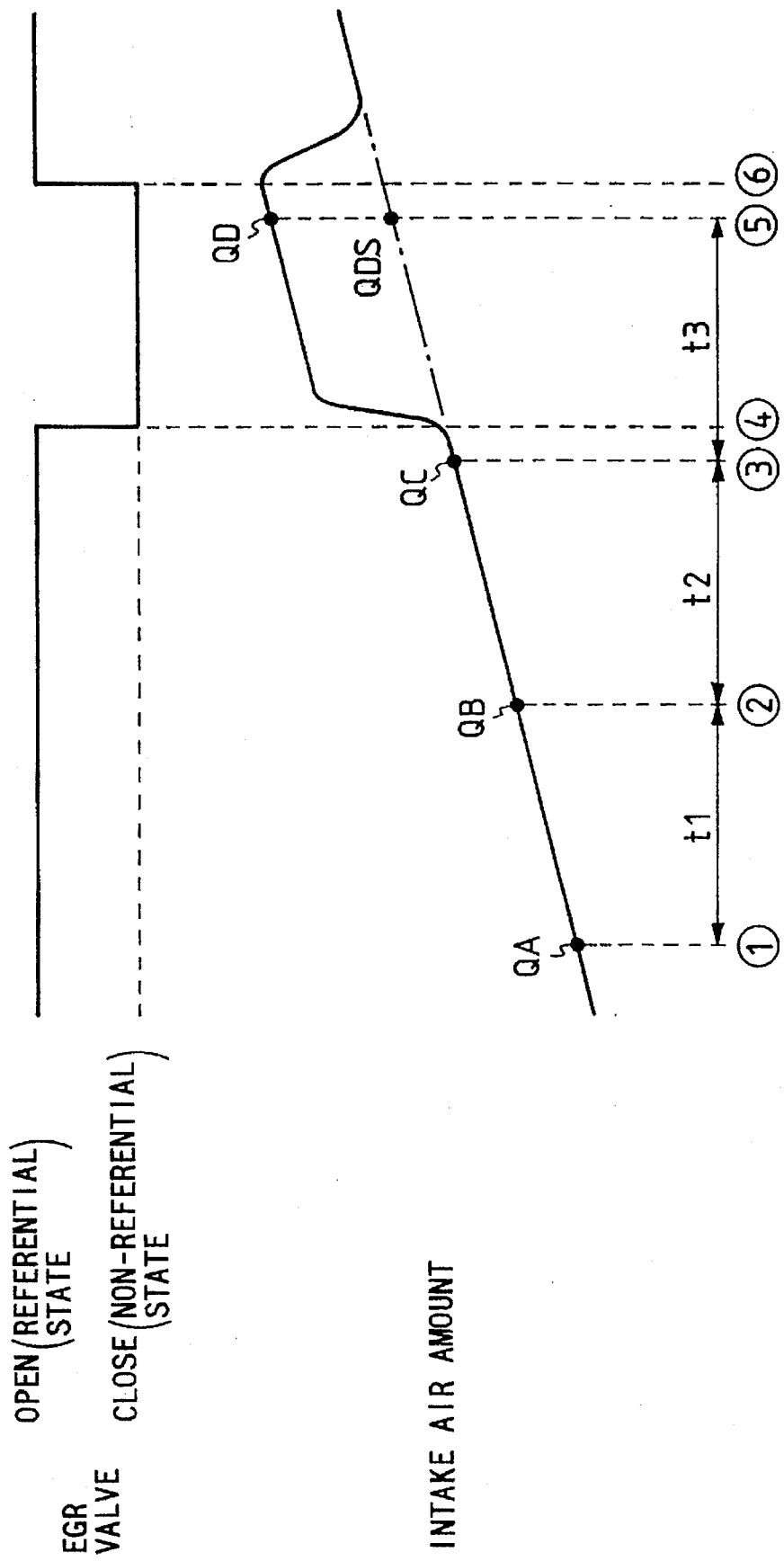
FIG. 2 is a time chart showing changes of operational condition of an internal combustion engine during an EGR abnormality judgement.

If the throttle opening degree θ causes no change during this acceleration, the intake air amount Q is substantially increased along an ascendent straight line in the duration from times "b" to "c". Hereinafter, this engine operating condition is referred to as a "constant (or stationary) accelerating condition". According to this embodiment, the EGR valve 25 is switched from the open state to the close state during such a constant accelerating condition, as shown in FIG. 2. The EGR abnormality judging routine shown in FIGS. 5 through 7 is performed on the basis of the change of the intake air amount Q detected during such a switching operation of the EGR valve 25.

Figure 5:
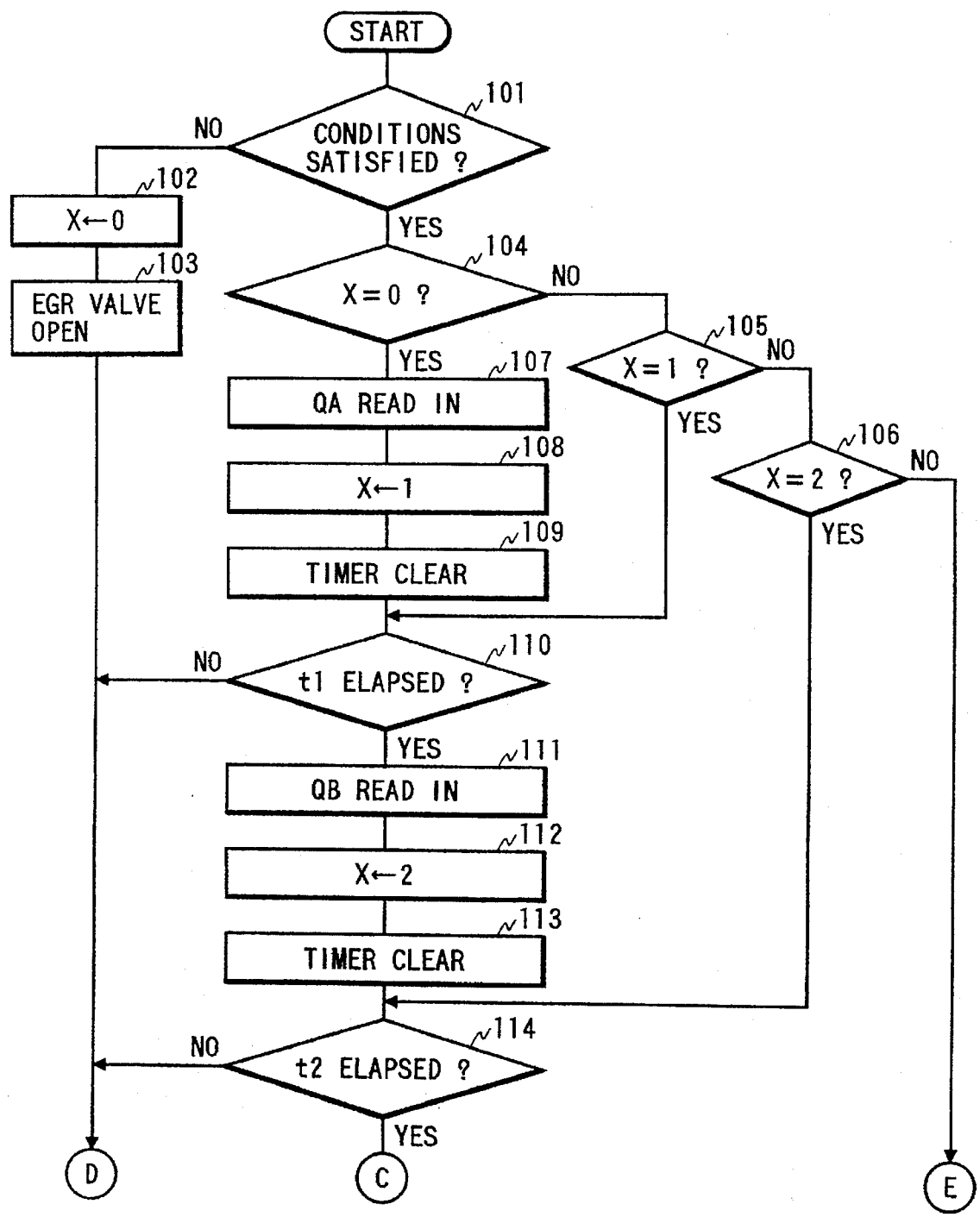
FIGS. 5 through 7 are flow charts showing an EGR abnormality judging routine in accordance with the first embodiment of the present invention.
Figure 6:
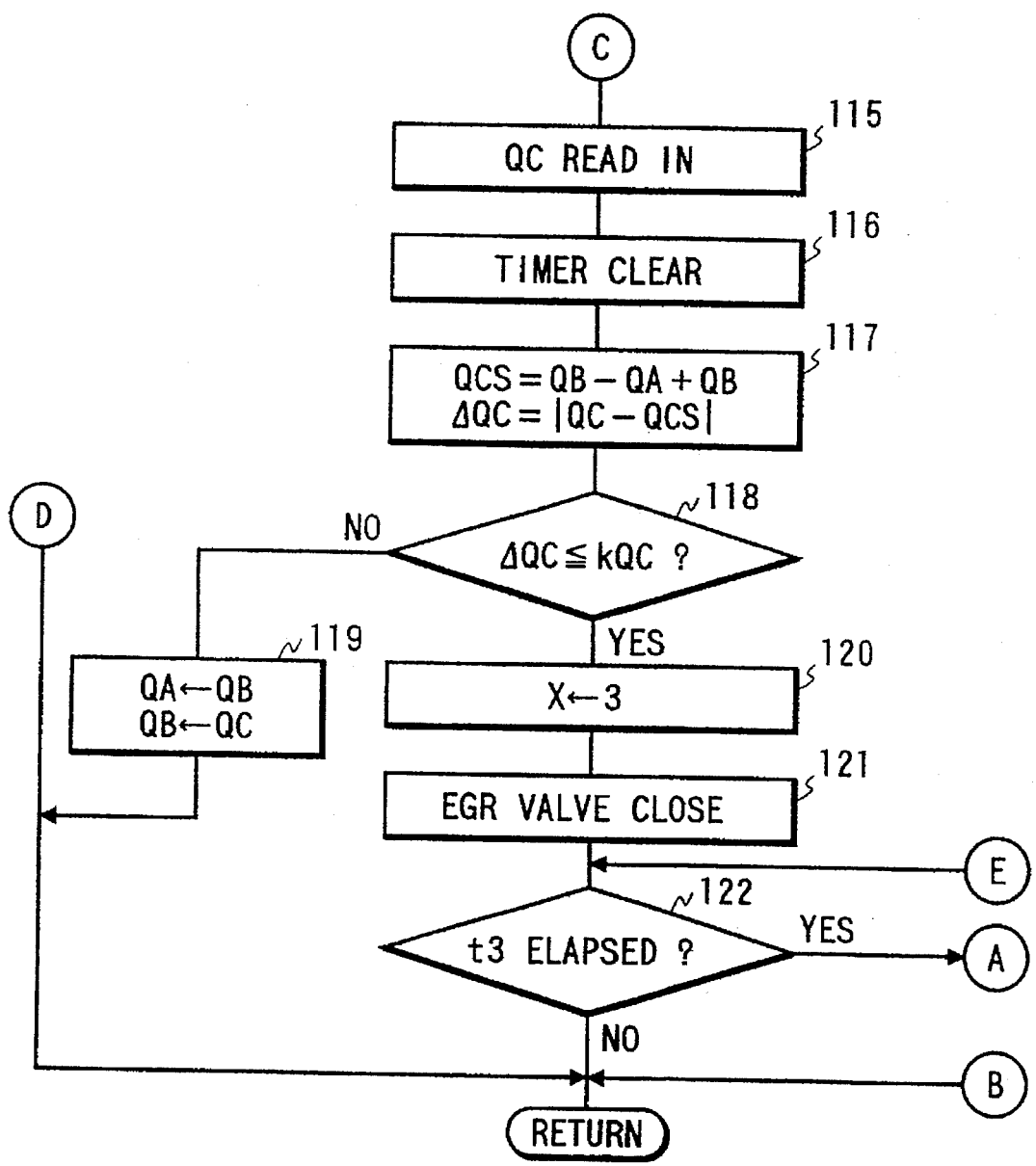
Figure 7:
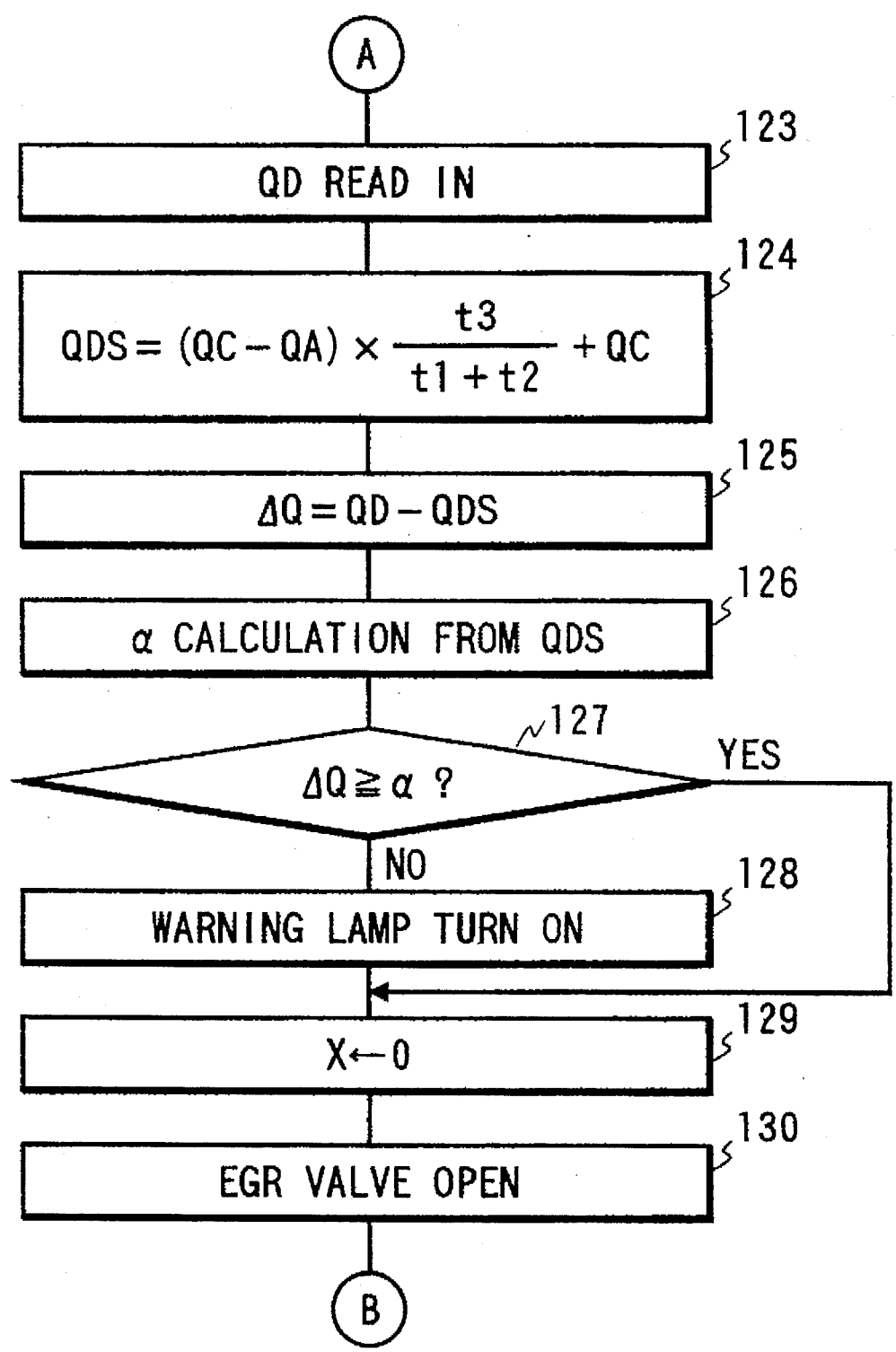

The EGR abnormality judging routine shown in FIGS. 5 through 7 is executed repetitively during the operation of the internal combustion engine 1. When the EGR abnormality judgement processing is started, the CPU of the control circuit 41 checks in step 101 whether or not the conditions for executing the abnormality judgement processing are satisfied. Details of the conditions are as follows:

the throttle opening degree θ is continuously maintained at a constant degree for a predetermined period of time or more after it is once increased; and an execution of the EGR abnormality judgement is allowed by an EGR abnormality judgement permitting means (not shown).

The length of the above predetermined period of time is determined in view of a time required for an automotive vehicle to reach a constant accelerating condition after the increase of the throttle valve opening θ. The EGR abnormality judgement permitting means allows the execution of the EGR abnormality judgement when any EGR abnormality judgement has not been yet executed since the internal combustion engine 1 has started its operation. This permission may be given repeatedly in response to each elapse of the predetermined time, or when the engine operating condition is in a specific condition.

The conditions for executing the abnormality judgement will not be established when the automotive vehicle is cruising at a constant speed or immediately after the automotive vehicle starts acceleration. Thus, when the judgement of the step 101 becomes "NO", the CPU proceeds to step 102 to reset the flag counter "X" to "0". This flag counter "X" is used when an intake air amount QA later described is read in. In the next step 103, the EGR valve 25 is opened and then the CPU completes the processing of the present cycle. Thereafter, the opening degree of EGR valve 25 is controlled to be a predetermined value in accordance with the operating condition of the internal combustion engine 1.

When the automotive vehicle enters into a constant accelerating condition, the conditions for the abnormality judgement will be established. Thus, the CPU proceeds from step 101 to step 104 wherein the CPU judges whether or not the flag counter "X" is "0". If the CPU already passed the step 102 in the previous cycle, the flag counter "X" will be already set to "0". Thus, the CPU proceeds to step 107 wherein a momentary intake air amount Q detected by the air flow meter 30 is read in and memorized as the intake air amount QA (at the timing (1) in FIG. 2).

Next, the CPU sets the flag counter "X" to "1" in step 108, and clears a timer in step 109. This timer is used to count up a predetermined time "t1". Then, the CPU makes a judgement in step 110 as to whether or not the predetermined time "t1 (e.g. 500 msec)" has already elapsed since the time (1) when the value "QA" was read in. If the predetermined time "t1" has not yet elapsed, the judgement result of the step 110 becomes "NO" and therefore the CPU completes the processing of the present cycle. As the flag counter "X" is already set to "1" for the next processing, CPU proceeds from step 104 to step 105. In this manner, a series of steps 101, 104, 105 and 110 provides a waiting time equivalent to the predetermined time "t1" after the time the value "QA" was read in.

If the predetermined waiting time "t1" has passed ("YES" in step 110), the CPU proceeds from step 110 to step 111 wherein a momentary intake air amount Q detected by the air flow meter 30 is read in and memorized as an intake air amount QB (at the timing (2) in FIG. 2). Next, the CPU sets the flag counter "X" to "2" in step 112, and clears the timer in step 113. The timer is used to count up a predetermined time "t2". Then, the CPU makes a judgement in step 114 as to whether or not the predetermined time "t2 (e.g. 500 msec)" has already elapsed since the time (2) when the value "QB" was read in. If the predetermined time "t2" has not yet elapsed, the judgement result of the step 114 becomes "NO" and therefore the CPU completes the processing of the present cycle. As the flag counter "X" is already set to "2" in the next processing, CPU proceeds from step 105 to step 106. In this manner, a series of steps 101, 104, 105, 106 and 114 provides a waiting time equivalent to the predetermined time "t2" after the time the value "QB" was read in.

If the predetermined waiting time "t2" has passed ("YES" in step 114), the CPU proceeds from step 114 to step 115 wherein a momentary intake air amount Q detected by the air flow meter 30 is read in and memorized as an intake air amount QC (at the timing (3) in FIG. 2). Next, the CPU clears the timer in step 116. The timer is used to count up a predetermined time "t3". Then, in step 117, the CPU obtains an imaginal intake air amount "QCS" as an air intake amount to be obtained at the time (3) under the constant accelerating condition, based on the intake air amounts "QA" and "QB" already read in the steps 107 and 111, using the following equation.

$$QCS=(QB-QA)\cdot t2/t1+QB \quad (1)$$

More specifically, the intake air amount Q smoothly increases along an ascendant straight line whenever the internal combustion engine 1 is operated in a constant accelerating condition. Based on this fact, the imaginal intake air amount "QCS", corresponding to the time (3), can be interpolated along the straight line passing both the intake air amounts "QA" and "QB". As the present embodiment sets the predetermined waiting times "t1" and "t2" to the same value, the above equation (1) is modified into the following equation.

$$QCS=QB-QA+QB \quad (2)$$

An absolute value ΔQC represents the difference between thus obtained imaginal intake air amount "QCS" and an actual intake air amount "QC" measured in the step 115. (i.e., ΔQC=|QC−QCS|)

Subsequently, the CPU makes a judgement in step 118 as to whether or not the value ΔQC is not larger than a predetermined value kQC. If the internal combustion engine 1 is operated in the constant accelerating condition, the intake air amount increases so linearly that the actual intake air amount "QC" is substantially equalized to the imaginal intake air amount "QCS", approximating the value ΔQC to "0". In other words, obtaining a large ΔQC means that "QA", "QB" and "QC" are not linearly aligned along a straight line. Thus, when "ΔQC" takes a large value, it can be concluded that the internal combustion engine is not operated in the constant accelerating condition. The practical value of the criterion kQC would be set to, for example, 0.1 g/sec in view of allowable deviation. The above-described two steps 117 and 118 cooperatively constitute the constant acceleration judging means M4 which judges as to whether or not the operating condition of the internal combustion engine 1 is in a constant accelerating condition.

When the step 118 judges that the operating condition of the internal combustion engine 1 is not in the constant accelerating condition (i.e. ΔQC>kQC), the CPU proceeds to step 119 wherein the intake air amount "QA" is replaced by the intake air amount "QB" while the intake air amount "QB" is replaced by the intake air amount "QC". And, the CPU completes the processing of the present cycle.

As the flag counter "X" is already set to "2" in the next processing, the CPU proceeds from step 104 to step 105, step 108 and step 114, successively. As the timer is already cleared in the above-described step 116, it is judged in the step 114 as to whether or not the predetermined time has elapsed since the previously described QC (substituted for "QB" in step 119) was read in. If the predetermined time "t2" has elapsed, a new actual intake air amount "QC" is read in through the steps 115, 116 and 117 and then an absolute value ΔQC is obtained. Thus, the step 118 again checks whether or not the internal combustion engine is operated in the constant accelerating condition.

As described above, after the intake air amounts "QA" and "QB" are read in, a series of steps 115, 116, 117, 118, 119, 101, 104, 105, 106 and 114 repetitively reads "QC" until the constant accelerating condition of the engine is detected.

When the constant accelerating condition is recognized in the step 118 (i.e. ΔQC≦kQC), the CPU sets the flag counter "X" to "3" in step 120 and then closes the EGR valve 25 in step 121 (at the time (4) in FIG. 2). Namely, the CPU (having the function of step 121) acts as the open/close control means M5 for switching the EGR valve 25 (i.e. open/close means M1) from the referential state (open) to the non-referential state (close) in response to the judgement of constant accelerating condition.

In the succeeding step 122, the CPU makes a judgement as to whether or not the predetermined time "t3 (e.g. 500 msec)" has elapsed since the latest "QC" was read in. If the predetermined time "t3" has not yet elapsed, the CPU completes the processing of the present cycle. As the flag counter "X" is already set to "3" in the next processing, the CPU proceeds from step 104 to step 105, step 106 and step 122, successively. In this manner, a series of steps 101, 104, 105, 106 and 122 provides a waiting time "t3" in response to every reading-in operation of "QC".

After the predetermined time "t3" has elapsed, the CPU proceeds to step 123 wherein a momentary intake air amount Q detected by the air flow meter 30 is read in and memorized as an intake air amount "QD" (at the time (5) in FIG. 2).

Next, in step 124, the CPU calculates an estimated intake air amount "QDS" to be measured at the time (5) if the EGR valve 25 (i.e. open/close means M1) is maintained at the referential state (i.e. open) under the continuous constant accelerating condition, using the following equation.

$$QDS=(QC-QA)\cdot t3/(t1+t2)+QC \qquad (3)$$

That is, the intake air amount Q smoothly increases along an ascendant straight line whenever the internal combustion engine 1 is operated in a constant accelerating condition. Based on this fact, the estimated intake air amount "QDS", corresponding to the time (5), can be interpolated along the straight line passing both the intake air amounts "QA" and "QC". Thus, the CPU (having the function of step 124) acts as the estimating means M6.

Subsequently, in step 125, a variation ΔQ is calculated by subtracting the estimated intake air amount "QDS" from the actual intake air amount "QD" corresponding to the time (5) measured in the step 123. (i.e. ΔQ=QD−QDS)

In short, this variation ΔQ represents a change of intake air amount Q due to the closing of the EGR valve 25.

Figure 8:
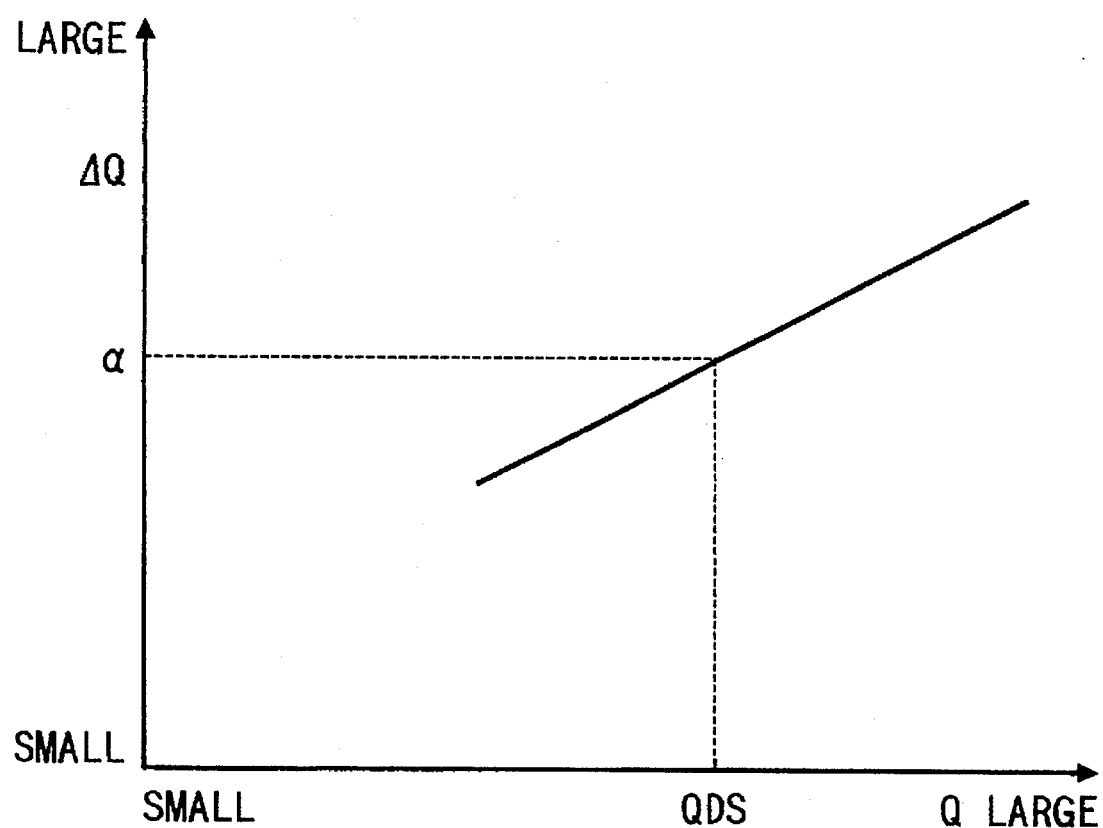
FIG. 8 is a graph showing a relationship between intake air amount "Q" and abnormality judgement level "α" in accordance with the first embodiment of the present invention.

Next, in step 126, the CPU obtains an abnormality judgement level "α" with reference to the map shown in FIG. 8. The variation ΔQ of the intake air amount Q due to the closing of the EGR valve 25 is proportional to the intake air amount Q. Thus, the EGR system 46, when it operates normally, shows a linear relationship shown in FIG. 8. Thus, in the step 126, the CPU obtains a variation ΔQ corresponding to the estimated intake air amount "QDS" as the abnormal judgement level "α".

Next, in step 127, the CPU makes a judgement as to whether or not the variation ΔQ is not smaller than the abnormality judgement level "α". When the variation ΔQ is not smaller than the abnormality judgement level "α", the CPU judges that the EGR system 46 is operated normally and then goes to step 129. On the other hand, when the variation ΔQ is smaller than the abnormality judgement level "α", the CPU judges that the EGR system 46 malfunctions and then goes to step 126 wherein the warning lamp 47 is turned on to notify the abnormality of the EGR system 46, then going to the step 129.

In the step 129, the flag counter "X" is set "0". Thereafter, the CPU proceeds to step 130 wherein the EGR valve 25 is opened (at the time (6) in FIG. 2). Then, the CPU completes the processing of EGR abnormality judgment. After that, the opening degree of EGR valve 25 is precisely adjusted to a predetermined value to perform an ordinary EGR control in accordance with operating conditions of the internal combustion engine 1. The above-described steps 125 through 127 act as the abnormality judging means M7.

By the way, once the abnormality judgement of EGR system 46 is completed, the above-described EGR abnormality judgement permitting means (not shown) prohibits the execution of the abnormality judgement until the predetermined permitting conditions are satisfied again. Thus, the judgement of the step 101 becomes "NO", allowing execution of the steps 101 through 103 only.

According to the above-described first embodiment, the EGR valve 25 is maintained at the referential state (open) until a constant accelerating condition is recognized. After the constant accelerating condition is surely recognized, the EGR valve 25 is switched for the first time to the non-referential state (close). In other words, this embodiment is characterized that the EGR abnormality judgement is postponed when the internal combustion engine 1 is not stably operated in a constant accelerating condition, thereby eliminating erroneous judgements and preventing the emission from being worsened.

Furthermore, the estimated intake air amount "QDS" for the referential state of the EGR valve 25 at the time (5) is accurately obtained using the interpolation based on the already detected intake air amounts "QA" and "QC". And, thus obtained estimated value "QDS" is compared with the actually detected intake air amount "QD" for the non-referential state of the EGR valve 25 at the time (5), thus judging whether the exhaust gas recirculation operation is normal or abnormal. Hence, according to this embodiment, the abnormality of the EGR system is accurately detectable.

Although the above-described first embodiment detects the presence of constant acceleration based on successive sampling of intake air amounts "QA", "QB" and "QC" (see FIG. 2) detected by the air flow meter 30, it is needless to say that the intake air amount can be replaced by any other parameter representing the operating condition of the internal combustion engine 1, such as the engine speed Ne, throttle opening degree θ, intake air pressure, or any combination of them.

Furthermore, the EGR valve 25 is not limited to a vacuum-servo type which is actuated using a negative pressure in the intake passage 3, and therefore can be any other type, for example, actuated by a step motor or the like.

Second Embodiment

In general, if the automotive vehicle is accelerated in response to an increase of the throttle opening degree θ, the engine speed Ne and the air intake amount Q (per unit time) will cause the changes shown in FIG. 4. For example, it is assumed that, after a constant-speed cruising of an automotive vehicle, the throttle valve opening degree θ is increased at the time "a". The intake air amount Q shows a steep increase for a moment immediately after the increase of the throttle valve opening degree θ, the increase of the intake air amount Q being then changed into a constant and stationary increase. In accordance with this acceleration, the engine speed Ne increases and also the vehicle speed increases correspondingly. Subsequently, the torque generated by the internal combustion engine 1 will be so increased that it is equalized with the running resistance of the automotive vehicle at the time "d". After reaching such an equilibrium condition, the engine speed Ne and the intake air amount Q are converged at constant values, with the automotive vehicle again cruising at a constant speed.

Figure 10:
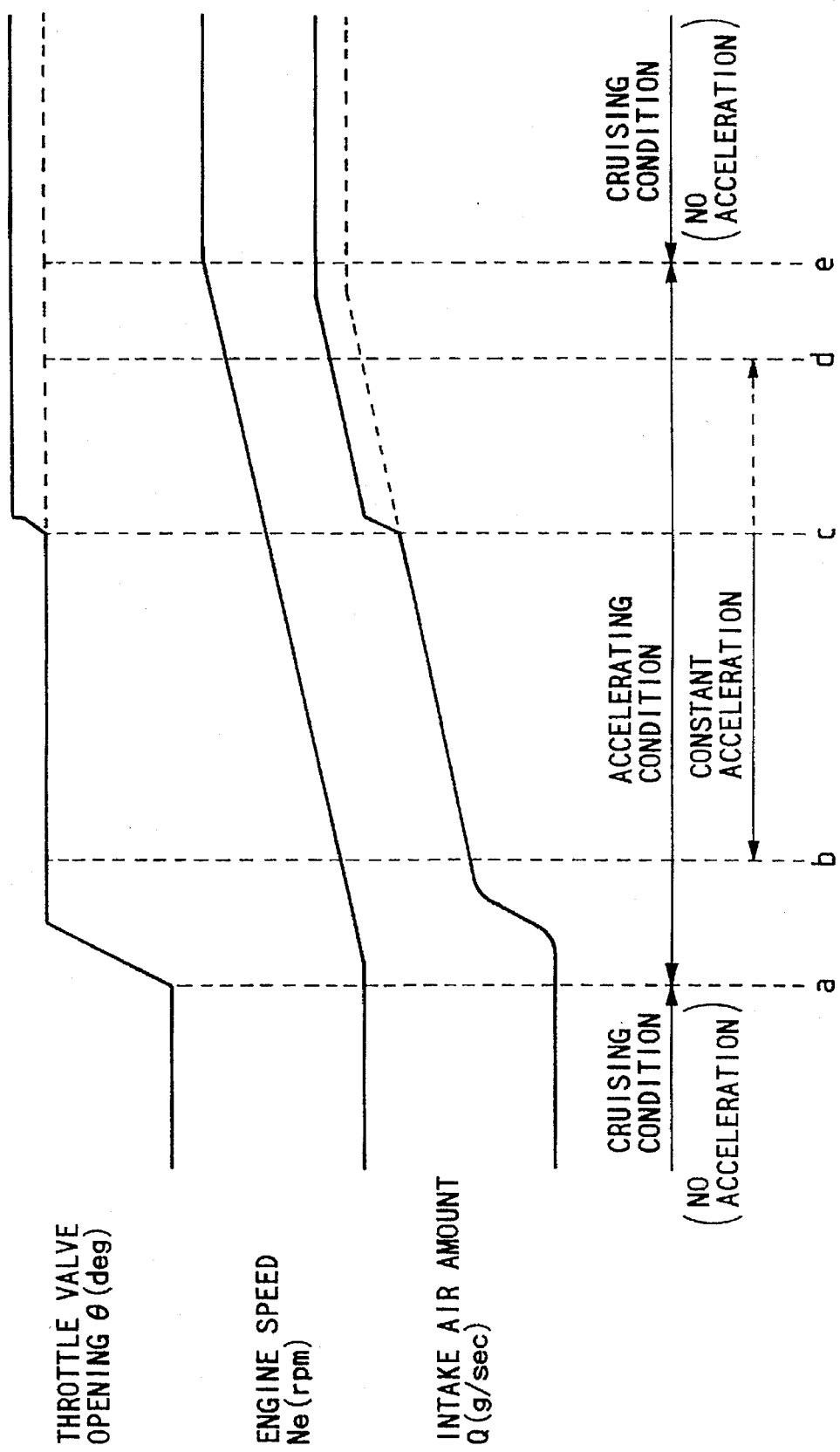
FIG. 10 is a time chart showing changes of operational condition in an accelerating condition of the internal combustion.
Figure 12:
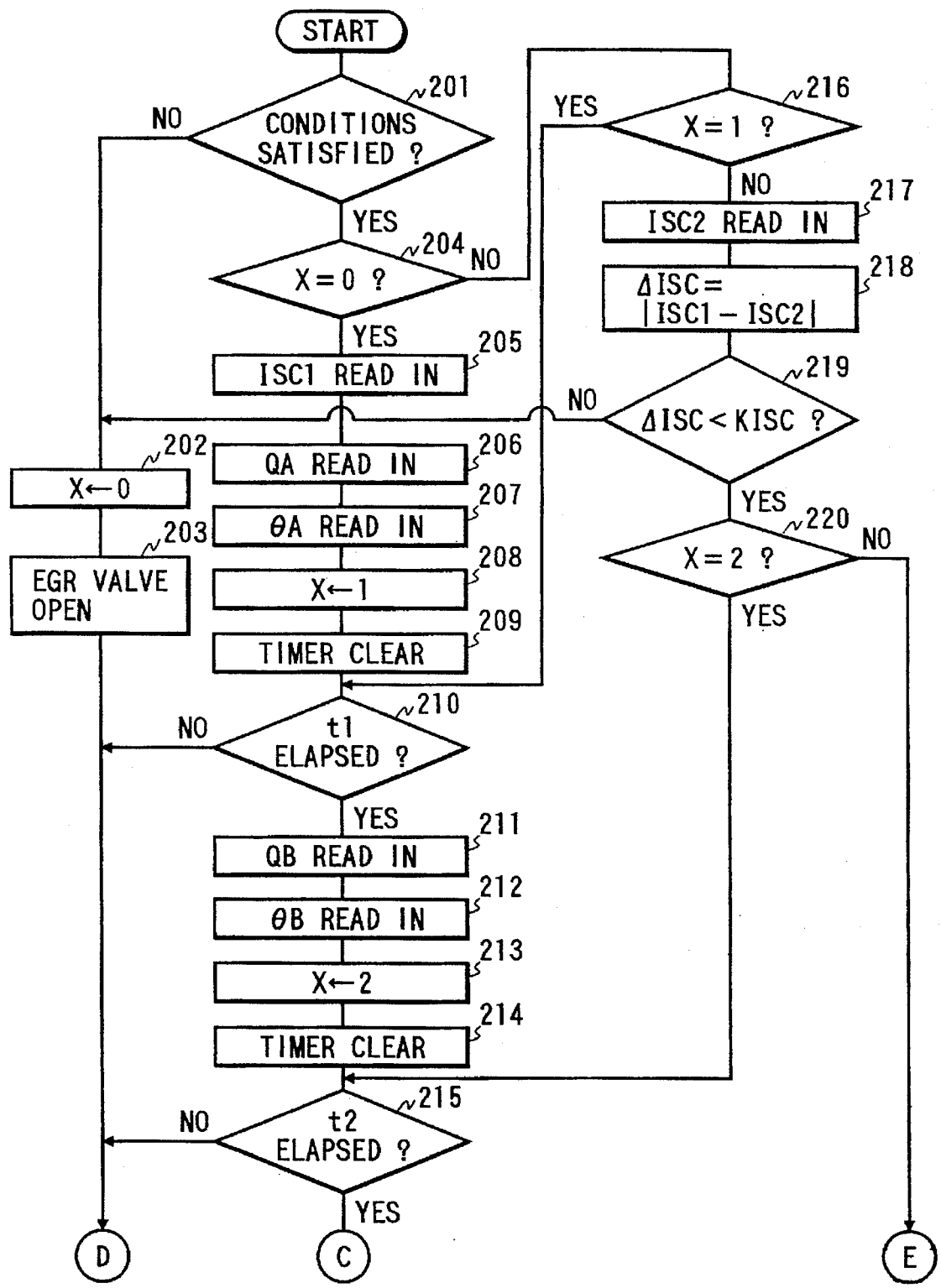
FIGS. 12 through 14 are flow charts showing an EGR abnormality judging routine in accordance with the second embodiment of the present invention.
Figure 13:
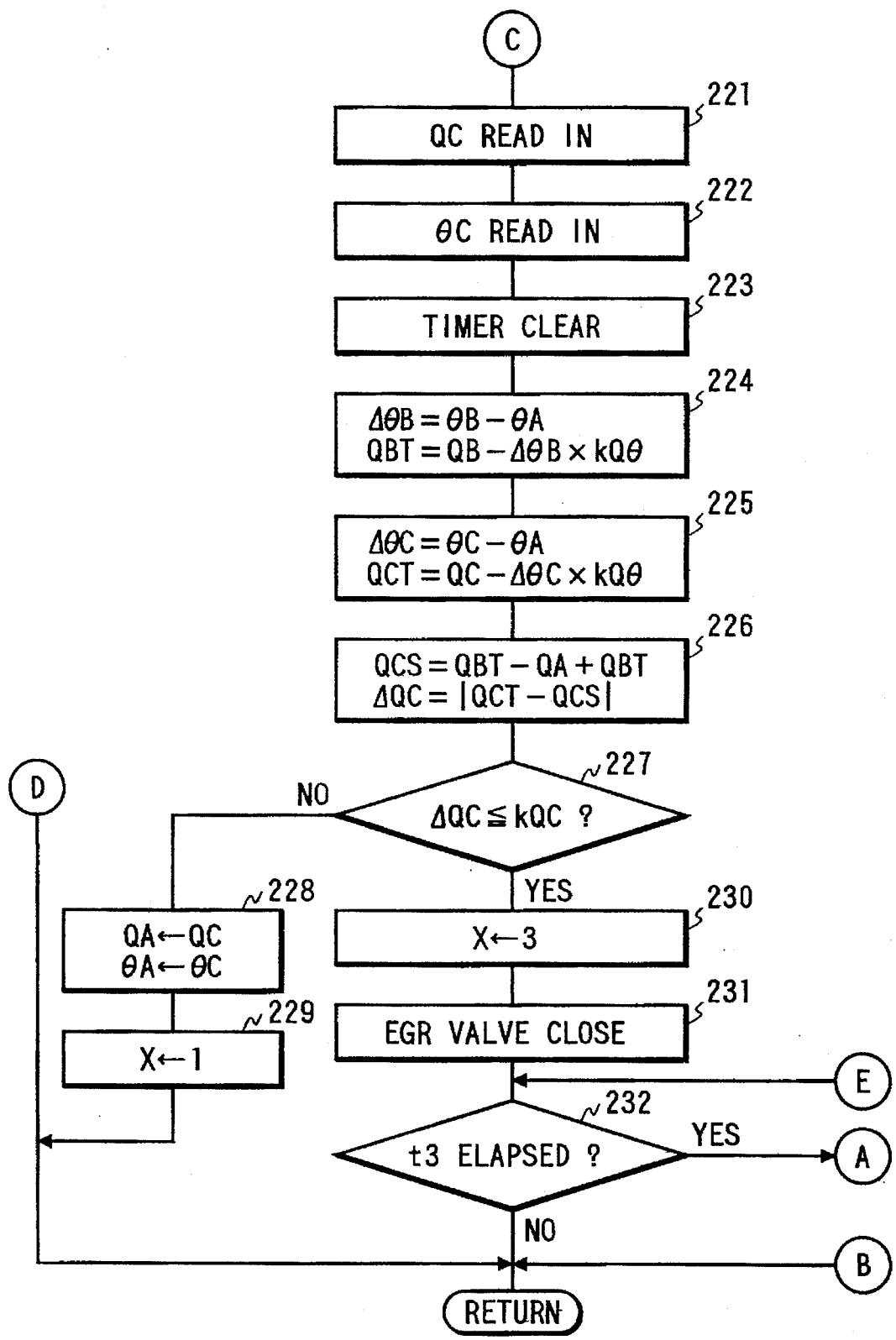
Figure 14:
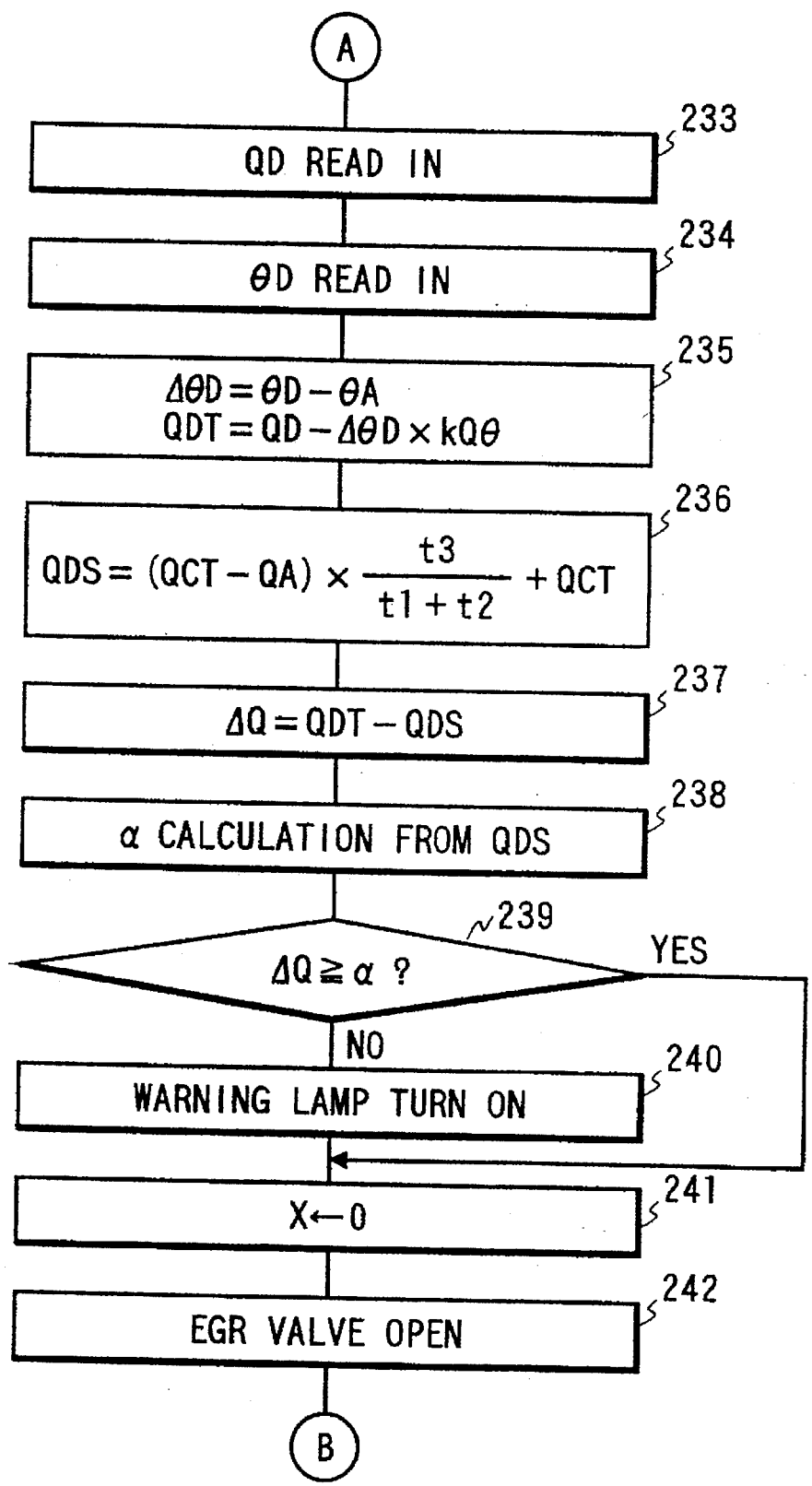
Figure 15:
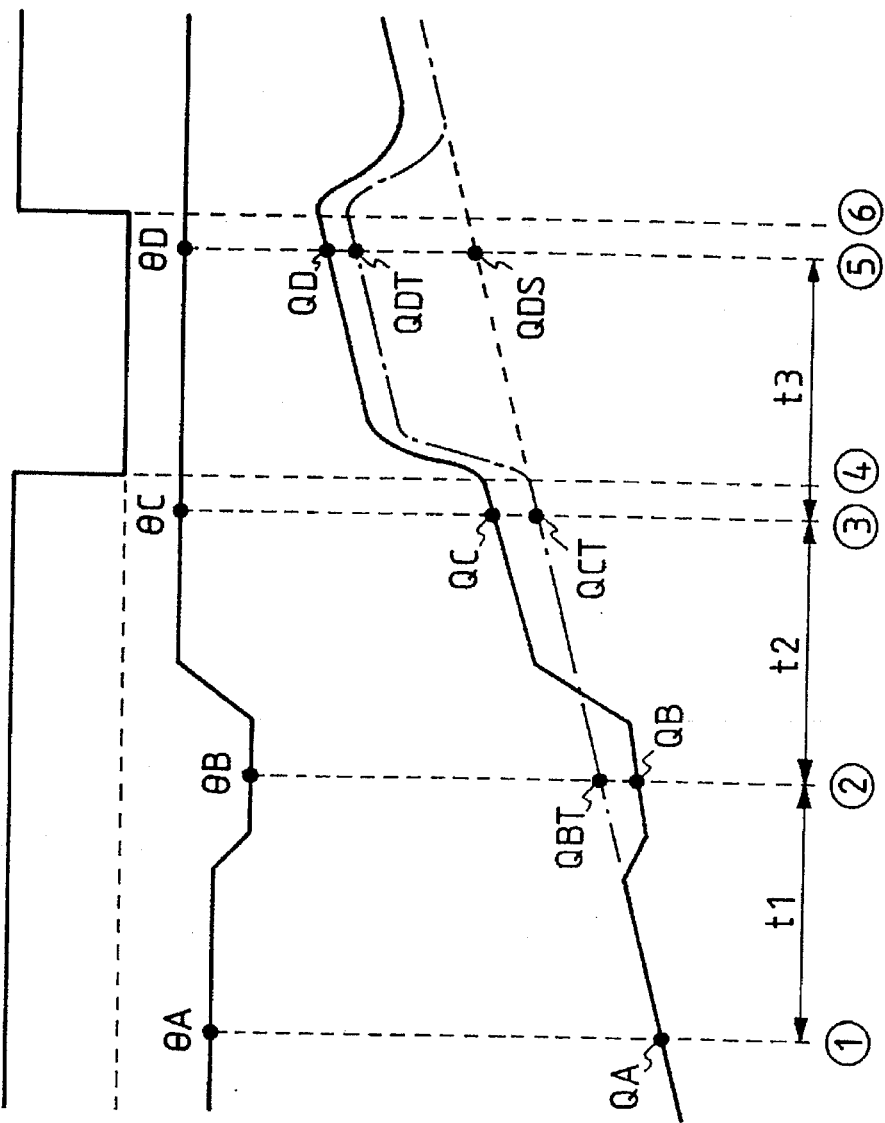
FIG. 15 is a time chart showing changes of operational condition of an internal combustion engine during an EGR abnormality judgement.

If the throttle opening degree θ causes a tiny change during this acceleration (from the time "c" as indicated by a solid line in FIG. 10), the intake air amount Q is correspondingly increased and offset from an ascendant straight line in the duration from times "b" to "c". The second embodiment regards such a tiny deviation of the engine operating condition as being substantially included in a "constant (or stationary) accelerating condition". According to this embodiment, the EGR valve 25 is switched from the open state to the close state during such a constant accelerating condition, as shown in FIG. 15. The EGR abnormality judging routine shown in FIGS. 12 through 14 is performed on the basis of the change of the intake air amount Q detected during such a switching operation of the EGR valve 25.

More specifically, if the throttle valve opening degree causes a substantial variation during the constant acceleration judgement as shown in FIG. 15, intake air amounts "QB" and "QC" actually measured at times (2) and (3) will be offset from the values "QBT" and "QCT" which should be detectable when the throttle valve opening causes no change. If the offset amount exceeds the predetermined value (i.e. ΔQC), the steps 117 and 116 of the first embodiment will judge that the internal combustion engine 1 is not operated in a constant accelerating condition, resulting in the unnecessary repetition of the constant acceleration judgement.

Furthermore, if the throttle valve opening degree θD at the time (5) is increased than the throttle valve opening degree θA at the time (1), the intake air amount variation "ΔQ" to be obtained in the step 125 of the first embodiment will be so changed that the accuracy of the abnormality judgement is fairly deteriorated.

Figure 11:
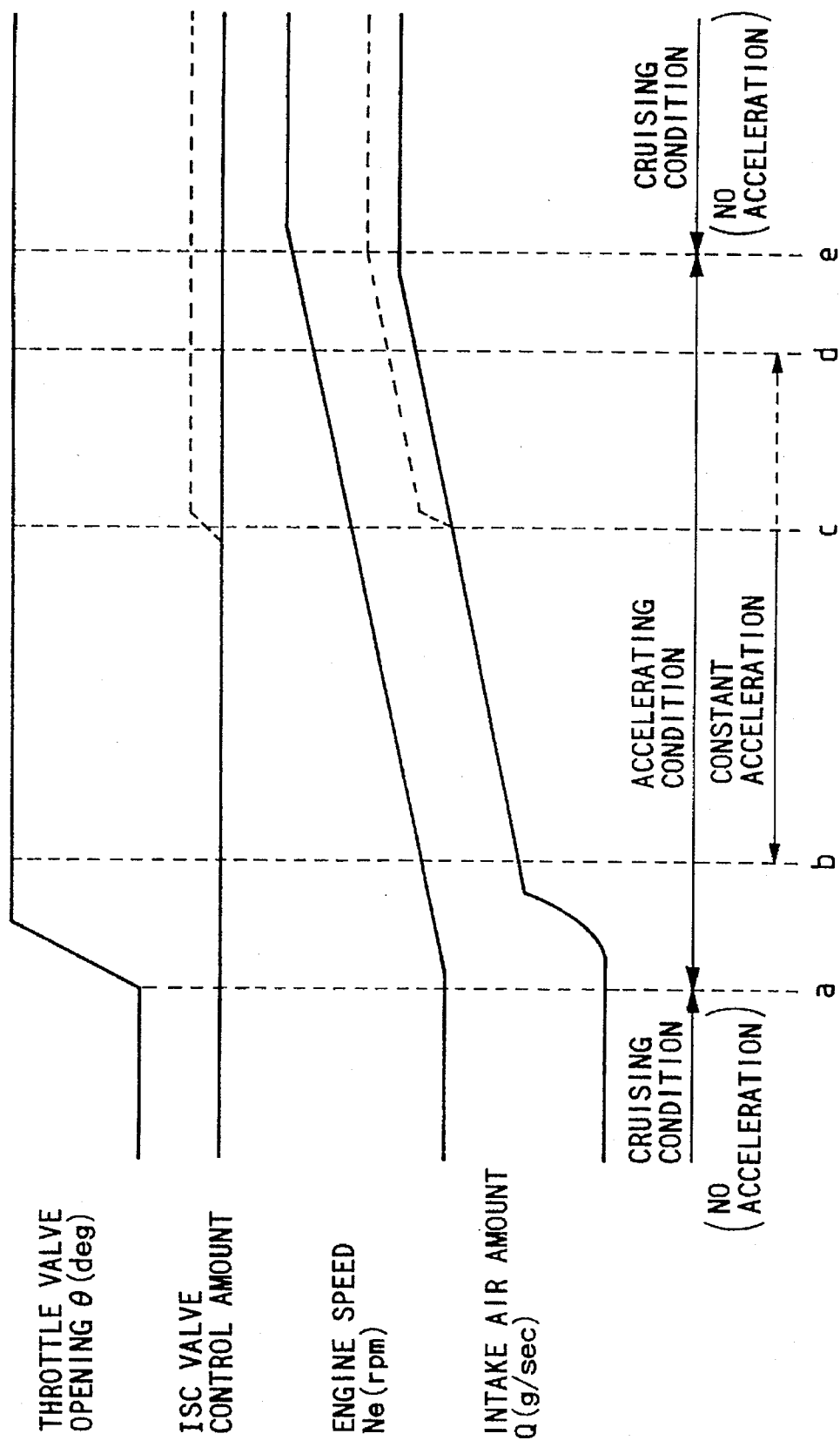
FIG. 11 is a time chart showing changes of operational condition in an accelerating condition of the internal combustion.

Moreover, besides the change of throttle valve opening, there are several factors giving a serious effect to the maintenance of a constant accelerating condition. For example, the ISC valve 51 provided in the bypass passage 50 adjusts the amount of bypass air introduced into the combustion chamber through the bypass passage 50 in the engine idling condition, so as to control the engine rotational speed in the idle condition. Hence, if the control amount of ISC valve 51 is changed as shown by a dotted line in FIG. 11, the air amount actually introduced into the combustion chamber will be varied irrespective of holding of throttle valve opening degree at a constant value. Under such a condition that an amount of auxiliary air is substantially changed, it is difficult to accurately judge the abnormality of the EGR system.

For some internal combustion engines, it is not rare that gas mixture containing evaporated fuel may be returned from a fuel tank through a canister to the intake passage 3 or assist air may be added to an immediately upstream portion of fuel injector to promote atomization of the injected fuel. Equipment of these systems will cause the same problem of auxiliary air above described.

To solve above-described problems, there is provided the second embodiment of the present invention.

Figure 9:
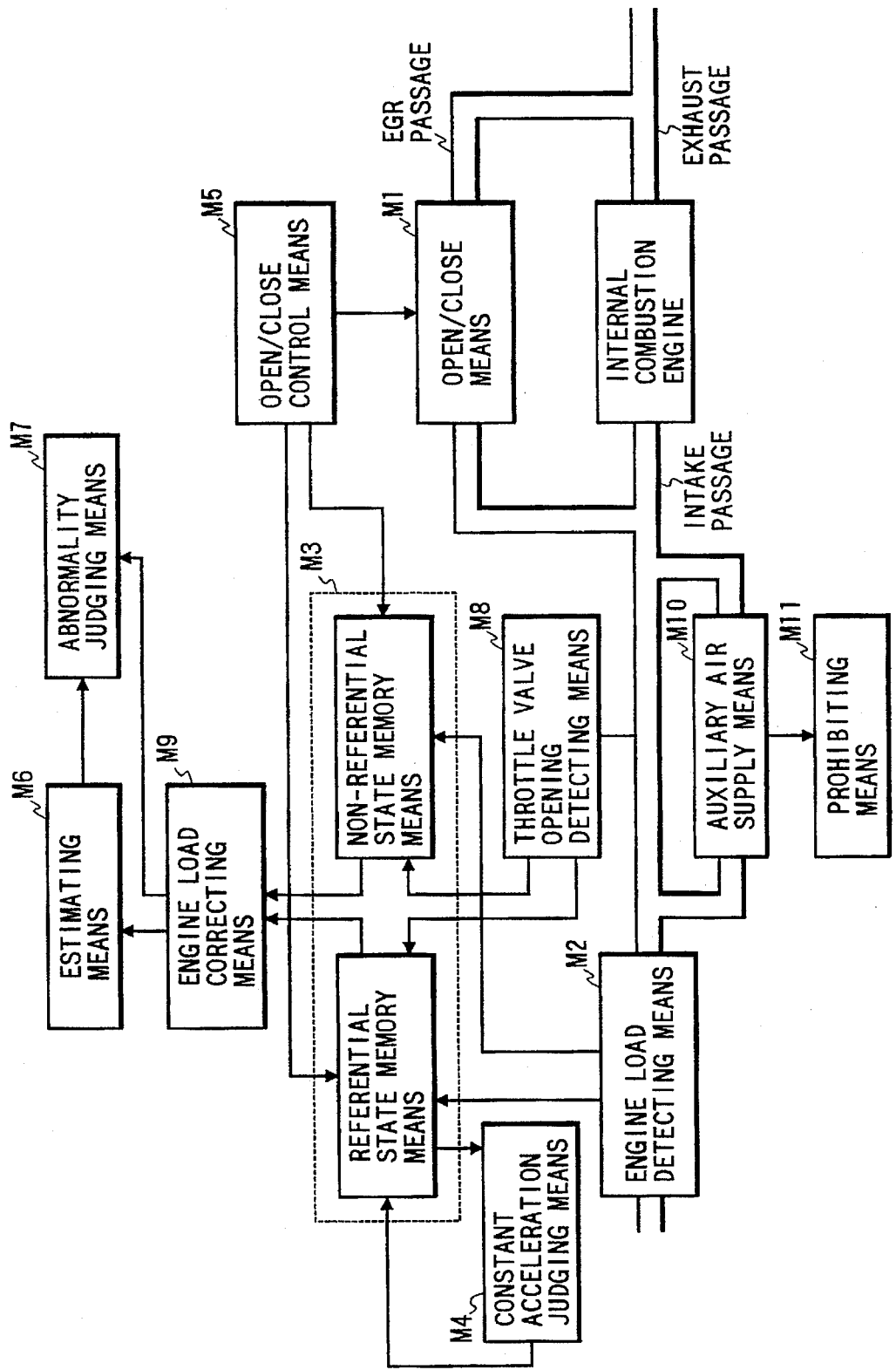
FIG. 9 is a schematic block diagram showing functional blocks constituting an exhaust gas recirculation system in accordance with a second embodiment of the present invention.

FIG. 9 shows a schematic arrangement of an exhaust gas recirculation system in accordance with the second embodiment of the present invention. An open/close means M1 opens or closes an exhaust gas recirculation passage recirculating exhaust gas of an internal combustion engine from an exhaust passage to an intake passage. An engine load detecting means M2 detects an engine load, such as an intake air amount or an intake air pressure, of the internal combustion engine. A throttle valve opening detecting means M6 detects the valve opening degree of a throttle valve controlling an intake air amount to be introduced into the internal combustion engine.

A memory means M3 comprises a referential state memory means and a non-referential state memory means. Either the open condition or closed condition of the open/close means M1 is specified as a referential state, while the other is specified as a non-referential state. The referential state memory memorizes an engine load detected by the engine load detecting means M2 and a throttle opening degree detected by the throttle valve opening detecting means M6 when the open/close means M1 is in the referential state. Meanwhile, the non-referential state memory memorizes an engine load detected by the engine load detecting means M2 and a throttle opening degree detected by the throttle valve opening detecting means M6 when the open/close means M1 is in the non-referential state.

A constant acceleration judging means M4 makes a judgement as to whether or not the operational condition of the internal combustion engine is in a constant accelerating condition. An open/close control means M5 switches the open/close means M1 from the referential state to the non-referential state in response to the constant accelerating condition detected by the constant acceleration judging means M4.

An engine load correcting means M9 corrects the engine load value detected by the engine load detecting means M2 in accordance with a resultant change of the throttle valve opening degree detected by the throttle valve opening detecting means M6.

An estimating means M6 calculates an estimated engine load to be measured if the open/close means M1 is maintained at the referential state under the constant valve opening degree of the throttle valve at the time an actual engine load is detected in the non-referential state, based on a plurality of detection values of the engine load values memorized in the referential state.

An abnormality judging means M7 compares the estimated engine load calculated by the estimating means M6 with a corrected actual engine load which is detected in the non-referential state and corrected in accordance with a resultant change of the throttle valve opening degree, thereby making a judgement as to whether the exhaust gas recirculating operation is normal or abnormal.

An auxiliary air supply means M10 supplies auxiliary air so as to change the air amount introduced into the combustion chamber of the engine. A prohibiting means M11 prohibits the abnormality judgement by the abnormality judging means M7.

According to the second embodiment, intake air amounts QA, QB, QC and QD are detected together with corresponding throttle opening degrees θA, θB, θC and θD at the times (1), (2), (3) and (5). When the throttle opening degrees θB, θC and θD are different from the throttle opening degree θA detected at the time (1), the detected intake air amounts QB, QC and QD are corrected into QBT, QCT and QDT which should be detectable when the throttle valve opening causes no change (i.e. θB=θC=θD=θA). Furthermore, a change of the auxiliary air supplied into the intake passage is detected momentarily, and the EGR abnormality judgement is prohibited when there is the possibility that the change of auxiliary air may deteriorate the accuracy of EGR abnormality judgement.

As well as the first embodiment, the second embodiment is embodied in the exhaust gas recirculation system applied to the internal combustion engine shown in FIG. 3.

The second embodiment performs an EGR abnormality judging routine shown in FIGS. 12 through 14 during the operation of the internal combustion engine 1. When the EGR abnormality judgement processing is started, the CPU of the control circuit 41 checks in step E01 whether or not the conditions for executing the abnormality judgement processing are satisfied. Details of the conditions are as follows:

the throttle opening degree θ is continuously maintained at a constant degree for a predetermined period of time or more after it is once increased; and an execution of the EGR abnormality judgement is allowed by an EGR abnormality judgement permitting means (not shown).

The length of the above predetermined period of time is determined in view of a time required for an automotive vehicle to reach a constant acceleration from the increase of the throttle valve opening θ. The EGR abnormality judgement permitting means allows the execution of the EGR abnormality judgement when any EGR abnormality judgement has not been yet executed since the internal combustion engine 1 has started its operation. This permission may be given repeatedly in response to each elapse of the predetermined time, or when the engine operating condition is in a specific condition.

The conditions for the abnormality judgement will not be established when the automotive vehicle is cruising at a constant speed or immediately after the automotive vehicle starts acceleration. Thus, when the judgement of the step 201 becomes "NO", the CPU proceeds to step 202 to reset the flag counter "X" to "0". This flag counter "X" is used when an intake air amount QA later described is read in. In the next step 203, the EGR valve 25 is opened and then the CPU completes the processing of the present cycle. Thereafter, the opening degree of EGR valve 25 is controlled to be a predetermined value in accordance with the operating condition of the internal combustion engine 1.

When the automotive vehicle enters into a constant accelerating condition, the conditions for the abnormality judgement will be established. Thus, the CPU proceeds from step 201 to step 204 wherein the CPU judges whether or not the flag counter "X" is "0" If the CPU already passed the step 202 in the previous cycle, the flag counter "X" will be already set to "0". Thus, the CPU proceeds to step 205 wherein a control amount of the ISC valve 51, i.e. a momentary bypass air amount, is read in and memorized as bypass air amount "ISC1". At the same time (at the time (1) in FIG. 15), the CPU performs the procedure of steps 208 and 207 wherein a momentary intake air amount Q detected by the air flow meter 30 is read in and memorized as intake air amount QA (step 206) and a momentary throttle opening degree θ detected by the throttle valve opening sensor 31 is read in and memorized as θA (step 207).

Next, the CPU sets the flag counter "X" to "1" in step 208, and clears a timer in step 209. This timer is used to count up a predetermined time "t1" Then, the CPU makes a judgement in step 210 as to whether or not the predetermined time "t1 (e.g. 500 msec)" has already elapsed since the time (1) when the value "QA" was read in. If the predetermined time "t1" has not yet elapsed, the judgement result of the step 210 becomes "NO" and therefore the CPU completes the processing of the present cycle. As the flag counter "X" is already set to "1" for the next processing, CPU proceeds from step 204 to step 216. In this manner, a series of steps 201, 204, 210 and 218 provides a waiting time equivalent to the predetermined time "t1" after the time (1) the value "QA" was read in.

If the predetermined waiting time "t1" has passed ("YES" in step 210), the CPU proceeds from step 210 to step 211 wherein a momentary intake air amount Q detected by the air flow meter 30 is read in and memorized as an intake air amount QB (at the timing (2) in FIG. 15). At the same time, the CPU performs the procedure of step 212 wherein a momentary throttle opening degree θ detected by the throttle valve opening sensor 31 is read in and memorized as Next, the CPU sets the flag counter "X" to "2" in step 213, and clears the timer in step 214. The timer is used to count up a predetermined time "t2" Then, the CPU makes a judgement in step 215 as to whether or not the predetermined time "t2 (e.g. 500 msec)" has already elapsed since the time (2) when the value "QB" was read in. If the predetermined time "t2" has not yet elapsed, the judgement result of the step 215 becomes "NO" and therefore the CPU completes the processing of the present cycle. As the flag counter "X" is already set to "2" in the next processing, CPU proceeds from step 216 to step 217.

In the step 217, a control amount of the ISC valve 51, i.e. a momentary bypass air amount, is read in and memorized as bypass air amount "ISC2". Subsequently, in step 218, the CPU obtains an absolute difference ISC between the bypass air control amount ISC1 read in the step 205 and the bypass air control amount ISC2 read in the step 218 (i.e. ΔISC= |ISC1−ISC2|). Then, in step 219, the CPU compares the resultant difference θISC with a predetermined value KISC. The predetermined value KISC is a criterion to judge whether or not the EGR abnormality judgement is accurately performed. For example, the constant KISC has a practical value equivalent to a control amount change of the ISC valve 51 causing a half intake air amount change of the abnormality judgement level If the value ΔISC is not smaller than KISC, the CPU proceeds to the step 202 without performing any EGR abnormality judgement. Namely, the above-described steps 217, 218 and 219 act as the abnormality judgement prohibiting means M11. If the value ΔISC is smaller than KISC, the CPU proceeds to step 220 wherein a judgement is made as to whether or not the flag counter "X" is set to "2". As the flag counter "X" is already set to "2" in the step 213, the CPU proceeds to the step 215. In this manner, a series of steps 201, 204, 210, 215, 216 and 220 provides a waiting time equivalent to the predetermined time "t2" after the time (2) when the value "QB" was read If the predetermined waiting time "t2" has passed ("YES" in step 215), the CPU proceeds from step 215 to step 221 wherein a momentary intake air amount Q detected by the air flow meter 30 is read in and memorized as an intake air amount QC (at the timing (3) in FIG. 15). At the same time, the CPU performs the procedure of step 222 wherein a momentary throttle opening degree θ detected by the throttle valve opening sensor 31 is read in and memorized as θC.

Next, the CPU clears the timer in step 223. In the next step 224, the CPU corrects the throttle valve opening degree θB in the following manner. First, the CPU obtains a difference ΔθB by subtracting the throttle valve opening degree θB at the timing (2) detected in the step 212 by the throttle valve opening degree θA at the timing (1) detected in the step 207 (i.e. ΔθB=θB−θA). Then, the CPU calculates an estimated intake air amount "QBT" which should be obtained when the throttle valve opening degree θB detected at the timing (2) is the same as the throttle valve opening degree θA at the timing (1), using the following equation based on thus obtained ΔθB.

$$QBT = QB - \Delta\theta B \times kQ\theta \quad (4)$$

where kQθ is a coefficient for converting the unit throttle valve opening change into an equivalent intake air amount change; the practical value of coefficient kQθ is, for example, 1.5 g/sec/deg which should be determined in accordance with engine operational conditions.

Next, in step 225, the CPU obtains a difference ΔθC by subtracting the throttle valve opening degree θC at the timing (3) detected in the step 222 by the throttle valve opening degree θA at the timing (1) detected in the step 207 (i.e. ΔθC=θC−θA). Then, the CPU calculates an estimated intake air amount "QCT" which should be obtained when the throttle valve opening degree θC detected at the timing (3) is the same as the throttle valve opening degree θA at the timing (1), using the following equation based on thus obtained ΔθC.

$$QCT = QC - \Delta\theta C \times kQ\theta \quad (5)$$

Next, the CPU judges whether or not the engine is operated in a constant accelerating condition. To this end, in step 228, the CPU obtains an imaginal intake air amount "QCS" as an air intake amount to be obtained at the time (3) under the constant accelerating condition, based on the intake air amounts "QA" and "QBT" already obtained in the steps 206 and 224, using the following equation.

$$QCS = (QBT - QA) \cdot t2/t1 + QBT \quad (6)$$

More specifically, the intake air amount Q smoothly increases along an ascendant straight line whenever the internal combustion engine 1 is operated in a constant accelerating condition. Based on this fact, the imaginal intake air amount "QCS", corresponding to the time (3), can be interpolated along the straight line passing both the intake air amounts "QA" and "QBT". As the present embodiment sets the predetermined waiting times "t1" and "t2" to the same value, the above equation (6) is modified into the following equation.

$$QCS = QBT - QA + QBT \quad (7)$$

Thereafter, the CPU obtains an absolute value ΔQC representing the difference between thus obtained imaginal intake air amount "QCS" and the corrected intake air amount "QCT" obtained in the step 225. (i.e., ΔQC=|QCT−QCS|)

Subsequently, the CPU makes a judgement in step 227 as to whether or not the value ΔQC is not larger than a predetermined value kQC. If the internal combustion engine 1 is operated in the constant accelerating condition, the intake air amount increases so linearly that the corrected intake air amount "QCT" is substantially equalized to the imaginal intake air amount "QCS", approximating the value ΔQC to "0". In other words, obtaining a large ΔQC means that "QA", "QBT" and "QCT" are not linearly aligned along a straight line. Thus, when "ΔQC" takes a large value, it can be concluded that the internal combustion engine is not operated in the constant accelerating condition. The practical value of the criterion kQC would be set to, for example, 0.1 g/sec in view of allowable deviation. The above-described four steps 224 through 227 cooperatively constitute the constant acceleration judging means which judges as to whether or not the operating condition of the internal combustion engine 1 is in a constant accelerating condition.

When the step 227 judges that the operating condition of the internal combustion engine 1 is not in the constant accelerating condition (i.e. ΔQC>kQC), the CPU proceeds to step 228 wherein the intake air amount "QA" is replaced by the intake air amount "QC" while the throttle valve opening degree θA is replaced by the throttle valve opening degree θC. And then, in step 229, the CPU sets the flag counter "X" to "1" and completes the processing of the present cycle.

In the next cycle, the CPU proceeds from step 201 to step 204, 216, 210, successively. As the timer is already cleared in the above-described step 223, it is judged in the step 210 as to whether or not the predetermined time "t1" has elapsed since the previously described QC and θC (substituted for "QA" and "θA" in step 228) were read in. The CPU newly reads in intake air amount QB and throttle opening degree θB (steps 211 and 212). After that, if the predetermined time "t2" has elapsed, the CPU newly reads in intake air amount QC and throttle opening degree θC (steps 221 and 222). And then, an absolute value ΔQC is again obtained through the correcting procedure defined by steps 224 through 228. Thus, at the step 227, the CPU again checks whether or not the internal combustion engine is operated in the constant accelerating condition.

Once the constant accelerating condition is recognized in the step 227 (i.e. ΔQC≦kQC), the CPU sets the flag counter "X" to "3" in step 230 and then closes the EGR valve 25 in step 231 (at the time (4) in FIG. 15). Namely, the CPU (having the function of step 231) acts as the open/close control means M5 for switching the EGR valve 25 (i.e. open/close means M1) from the referential state (open) to the non-referential state (close) in response to the judgement of constant accelerating condition.

In the succeeding step 232, the CPU makes a judgement as to whether or not the predetermined time "t3 (e.g. 500 msec)" has elapsed since the latest "QC" was read in. If the predetermined time "t3" has not yet elapsed, the CPU completes the processing of the present cycle. As the flag counter "X" is already set to "3" in the next cycle, the CPU proceeds from step 204 to step 216, step 220 and step 232, successively. In this manner, a series of steps 201, 204, 216, 220, and 232 provides a waiting time "t3" in response to every reading-in operation of "QC".

After the predetermined time "t3" has elapsed, the CPU proceeds to step 233 wherein a momentary intake air amount detected by the air flow meter 30 is read in and memorized as an intake air amount "QD" (at the time (5) in FIG. 15). At the same time, in step 234, the CPU reads in a momentary throttle valve opening degree θ as θD.

Next, in step 235, the CPU obtains a difference OC by subtracting the throttle valve opening degree θD at the timing (5) detected in the step 234 by the throttle valve opening degree θA at the timing (1) detected in the step 207 (i.e. ΔθD=θD−θA). Then, the CPU calculates a corrected intake air amount "QDT" which should be obtained when the throttle valve opening degree θD detected at the time (5) is the same as the throttle valve opening degree θA at the timing (1), using the following equation based on thus obtained ΔθD.

$$QDT = QD - \Delta\theta D \times kQ\theta \quad (8)$$

The above-described steps 224, 225 and 235 act as engine load correcting means M9.

Next, in step 236, the CPU calculates an estimated intake air amount "QDS" to be measured at the time (5) if the EGR valve 25 (i.e. open/close means M1) is maintained at the referential state (i.e. open) under the continuous constant accelerating condition, using the following equation.

$$QDS = (QCT - QA) \cdot t3/(t1+t2) + QCT \quad (9)$$

That is, the intake air amount Q smoothly increases along an ascendant straight line whenever the internal combustion engine 1 is operated in a constant accelerating condition. Based on this fact, the estimated intake air amount "QDS", corresponding to the time (5), can be interpolated along the straight line passing both the intake air amounts "QA" and "QCT". Thus, the CPU (having the function of step 236) acts as the estimating means M6.

Subsequently, in step 237, a variation $\Delta Q$ is calculated by subtracting the estimated intake air amount "QDS" from the corrected intake air amount "QDT" corresponding to the time (5) measured in the step 235. (i.e. $\Delta Q = QDT - QDS$)

In short, this variation $\Delta Q$ represents a change of intake air amount Q due to the closing of the EGR valve Next, in step 238, the CPU obtains an abnormality judgement level "$\alpha$" with reference to the map shown in FIG. 8. The variation $\Delta Q$ of the intake air amount Q due to the closing of the EGR valve 25 is proportional to the intake air amount Q. Thus, the EGR system 48, when it operates normally, shows a linear relationship shown in FIG. 8. Thus, in the step 238, the CPU obtains a variation $\Delta Q$ corresponding to the estimated intake air amount "QDS" as the abnormal judgement level "$\alpha$".

Next, in step 239, the CPU makes a judgement as to whether or not the variation $\Delta Q$ is not smaller than the abnormality judgement level "$\alpha$". When the variation $\Delta Q$ is not smaller than the abnormality judgement level "$\alpha$", the CPU judges that the EGR system 48 is operated normally and then goes to step 241. On the other hand, when the variation $\Delta Q$ is smaller than the abnormality judgement level "$\alpha$", the CPU judges that the EGR system 46 malfunctions and then goes to step 240 wherein the warning lamp 47 is turned on to notify the abnormality of the EGR system 46, then going to the step 241.

In the step 241, the flag counter "X" is set "0". Thereafter, the CPU proceeds to step 242 wherein the EGR valve 25 is opened (at the time (6) in FIG. 15). Then, the CPU completes the processing of EGR abnormality judgement. After that, the opening degree of EGR valve 25 is precisely adjusted to a predetermined value to perform an ordinary EGR control in accordance with operating conditions of the internal combustion engine 1. The above-described steps 237 through 239 act as the abnormality judging means M7.

By the way, once the abnormality judgement of EGR system 46 is completed, the above-described EGR abnormality judgement permitting means (not shown) prohibits the execution of the abnormality judgement until the predetermined permitting conditions are satisfied again. Thus, the judgement of the step 201 becomes "NO", allowing execution of the steps 201 through 203 only.

According to the above-described second embodiment, when the throttle opening degrees $\theta B$, $\theta C$ and $\theta D$ detected at the times (2), (3) and (5) are changed from the throttle opening degree $\theta A$, the intake air amounts QB, QC and QD detected at the times (2), (3) and (5) are corrected to QBT, QCT and QDT, respectively, which should be obtained when the throttle valve opening causes no changes. Adopting such correction is useful and effective to provide an enlarged region capable of being regarded as a constant accelerating condition, resulting in earlier completion of the EGR abnormality judgement.

Furthermore, the above-described second embodiment always monitors the change of the control amount of ISC valve 51 during the EGR abnormality judgement. If the change of the control amount of ISC valve 51 is not smaller than the predetermined criterion KISC, the EGR abnormality judgement is prohibited. Thus, the EGR abnormality judgement is no longer given an adverse effect derived from the change of auxiliary air, and thus can be performed accurately.

According to the second embodiment, intake air amounts QA, QB, QC and QD are detected together with corresponding throttle opening degrees $\theta A$, $\theta B$, $\theta C$ and $\theta D$ at the times (1), (2), (3) and (5). When the throttle opening degrees $\theta B$, $\theta C$ and $\theta D$ are different from the throttle opening degree $\theta A$ detected at the time (1), the detected intake air amounts QB, QC and QD are corrected into QBT, QCT and QDT which should be detectable when the throttle valve opening causes no change (i.e. $\theta B = \theta C = \theta D = \Delta A$). Furthermore, a change of the auxiliary air supplied into the intake passage is monitored momentarily, and the EGR abnormality judgement is prohibited when there is the possibility that the change of auxiliary air may deteriorate the accuracy of EGR abnormality judgement.

Although the above-described second embodiment detects the intake air amounts "QA","QB" and "QC" as engine load, it is well known that the intake air amount has a close correlation with intake air pressure. Thus, it is needless to say that the detection of intake air amount is equivalent to the detection of intake air pressure. In this respect, the intake air pressure sensor 80 is provided in the intake passage 3 at the downstream portion of the throttle valve In this case, the constant $kQ\theta$ used in the steps 224, 225 and 234 is replaced By a constant $kP\theta$. The constant $kP\theta$ is a coefficient for converting the unit throttle valve opening change into an equivalent intake air pressure change. To increase accuracy in the correction of engine load (i.e. intake air amount, or intake air pressure, or equivalent thereof) during the EGR abnormality judgement, it is desirable that the coefficients $kQ\theta$ and $kP\theta$, employed in the second embodiment, are set as table data variable in accordance with the engine operating conditions.

Furthermore, the throttle valve opening is closely correlated with an accelerator pedal angle. Thus, the detection of the throttle valve opening can be realized by detecting the accelerator pedal angle. In other words, it should be understood that the throttle valve opening detecting means M6 comprises an accelerator pedal angle sensor as well as the throttle valve opening sensor 31.

Furthermore, the EGR valve 25 is not limited to a vacuum-servo type which is actuated using a negative pressure in the intake passage 3, and therefore can be any other type, for example, actuated by a step motor or the like.

Although the above-described second embodiment prohibits the EGR abnormality judgement when the control amount change of the ISC valve 51 exceeds the predetermined value KISC, it is alternatively desirable that the control of the ISC valve 51 is restricted during the EGR abnormality judgement by completely prohibiting the change of the ISC valve 51 or suppressing the change within a predetermined range.

Third Embodiment

Figure 16:
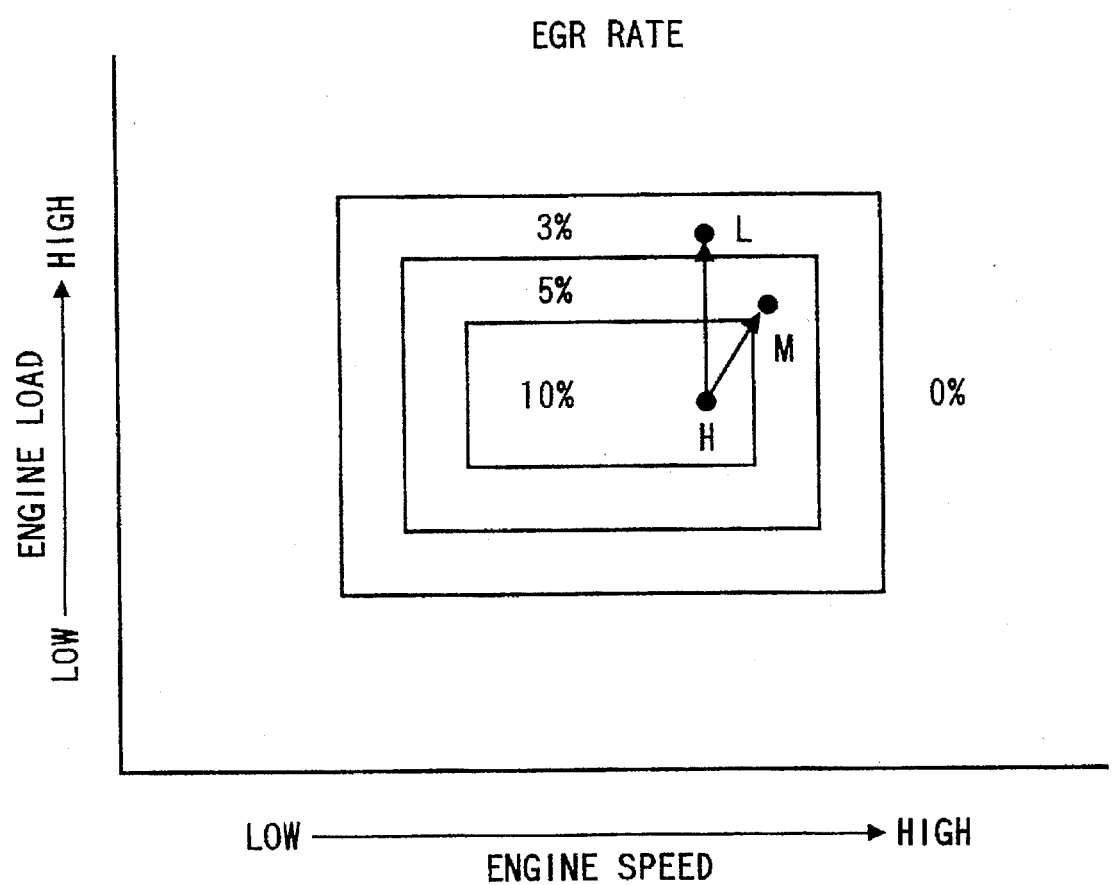
FIG. 16 is a graph showing an example of EGR rate in the form of a map finely determined in accordance with engine operating conditions.

Recent EGR systems finely control the opening degree of the EGR valve 25 so that the. EGR rate is suitably changed in accordance with the engine speed and the engine load, as shown in FIG. 16. If the EGR abnormality judgement processing is performed during the transition of the EGR rate from the "H" (e.g. 10%) region to "L" (e.g. 3%) or "M" (e.g. 5%) region, there will be the possibility that the abnormality is erroneously detected.

Figure 17:
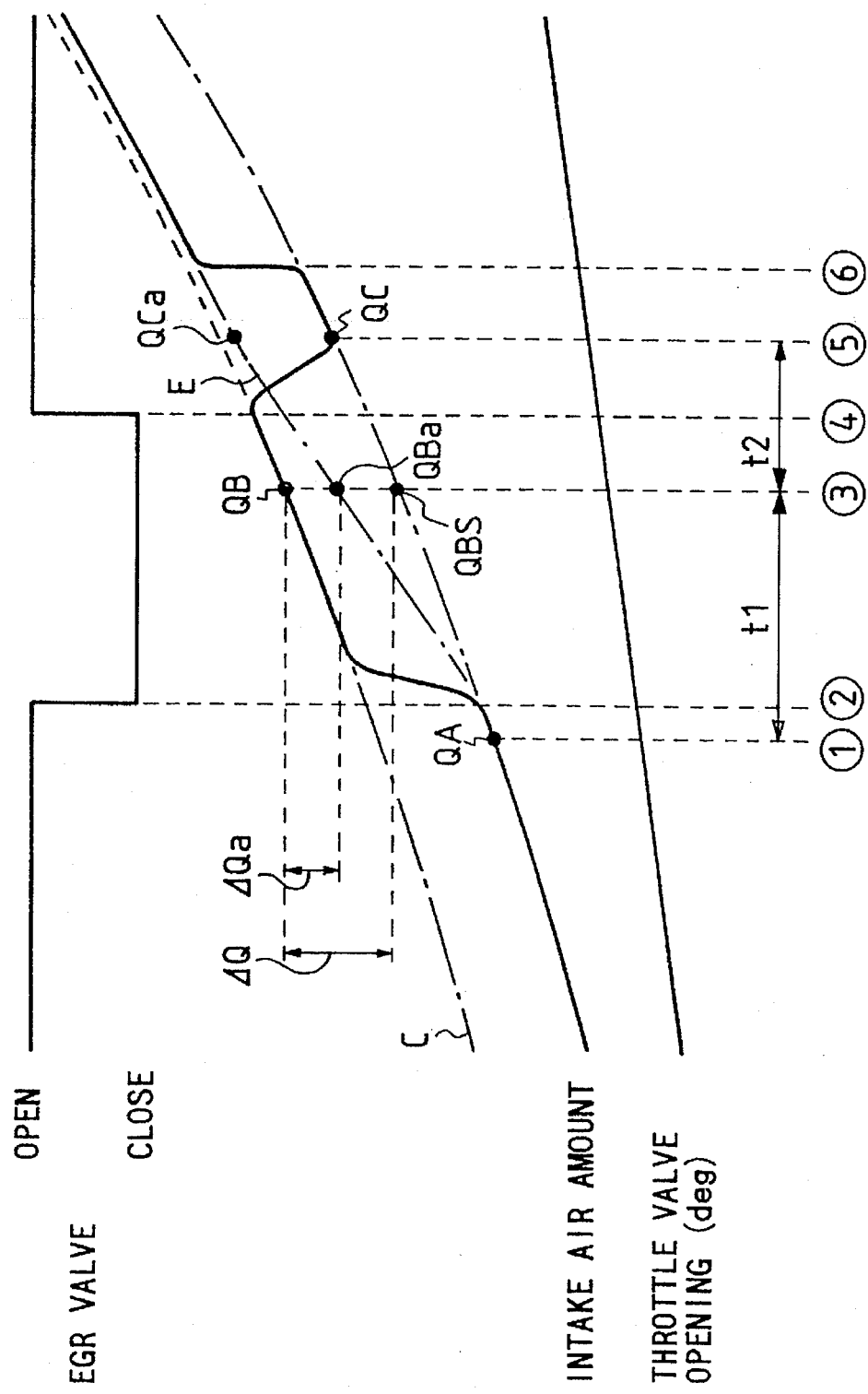
FIG. 17 is a time chart showing changes of operational condition of an internal combustion engine during an EGR abnormality judgement.

For example, as shown in FIG. 17, the EGR abnormality judgement processing is started under the condition where the EGR valve 25 is opened. An alternate long and short dash line "C" represents the virtual increase of an intake air amount if the EGR valve 25 is closed. After an intake air amount "QA" is first detected at the time (1), the EGR valve 25 is closed. Subsequently, an intake air amount "QB" is detected at the time (3). Thereafter, the EGR valve 25 is again opened and an intake air amount "QC" is detected at the time (5).

Now it is assumed that the EGR rate is shifted from the "H" region to the "L" region due to the change of operational condition of the internal combustion engine 1. If the EGR valve 25 is switched from the closed state to the open state in synchronism with such a transition of the EGR rate, a change of intake air amount will become small before and after the switching of the EGR valve 25, as shown by an alternate long and short dash line "E" in FIG. 17. More specifically, the intake air amount "QCa" detectable at the time (5) is very close to the value to be obtained under the condition where the EGR valve 25 is closed.

An estimated intake air amount "QBa", which should be obtainable at the time (3), can be calculated by interpolating "QCa" and "QA". Then, the estimated intake air amount "QBa" is compared with the actually measured intake air amount "QB" to obtain a difference ΔQBa therebetween (i.e. ΔQBa=QB−QBa). This difference ΔQBa will be so small that the abnormality judgement is erroneously performed.

In view of above problems, the third embodiment of the present invention provides an EGR system capable of restricting the change of opening degree of the EGR valve 25 when the operating condition of the internal combustion engine 1 is changed from the "H" region to the "L" or "M" region as shown in FIG. 16.

Figure 18:
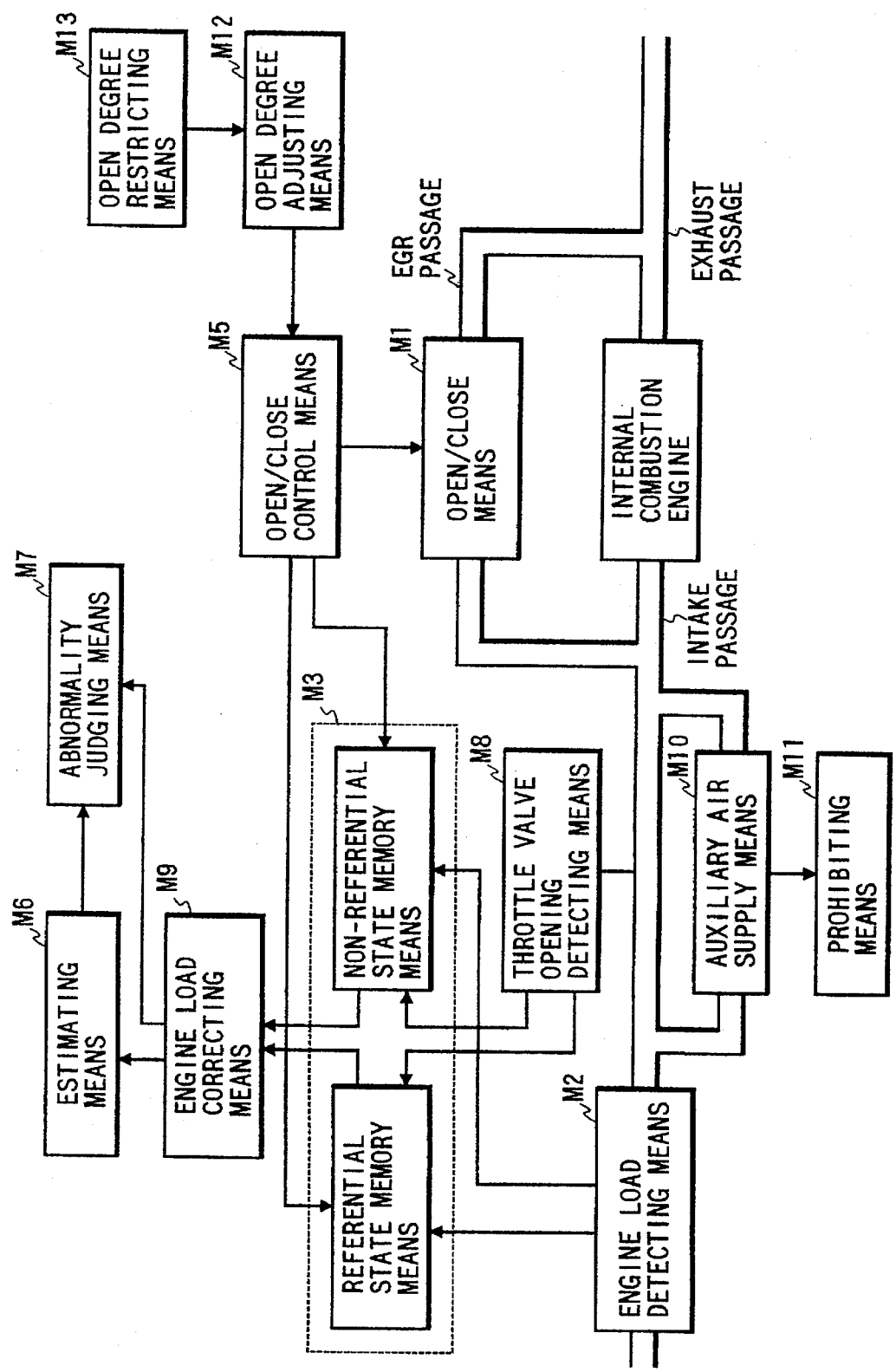
FIG. 18 is a schematic block diagram showing functional blocks constituting an exhaust gas recirculation system in accordance with a third embodiment of the present invention.

FIG. 18 shows a schematic arrangement of an exhaust gas recirculation system in accordance with the third embodiment of the present invention. An open/close means M1 opens or closes an exhaust gas recirculation passage recirculating exhaust gas of an internal combustion engine from an exhaust passage to an intake passage. An engine load detecting means M2 detects an engine load, such as an intake air amount or an intake air pressure, of the internal combustion engine. A throttle valve opening detecting means M6 detects the valve opening degree of a throttle valve controlling an intake air amount to be introduced into the internal combustion engine.

A memory means M3 comprises a referential state memory means and a non-referential state memory means. Either the open condition or closed condition of the open/close means M1 is specified as a referential state, while the other is specified as a non-referential state. The referential state memory memorizes an engine load detected by the engine load detecting means M2 and a throttle opening degree detected by the throttle valve opening detecting means M6 when the open/close means M1 is in the referential state. Meanwhile, the non-referential state memory memorizes an engine load detected by the engine load detecting means M2 and a throttle opening degree detected by the throttle valve opening detecting means M6 when the open/close means M1 is in the non-referential state.

An open/close control means M5 switches the open/close means M1 from the referential state to the non-referential state. An engine load correcting means M9 corrects the engine load value detected by the engine load detecting means M2 in accordance with a resultant change of the throttle valve opening degree detected by the throttle valve opening detecting means M6. An estimating means M6 calculates an estimated engine load to be measured if the open/close means M1 is maintained at the referential state under the continuous constant accelerating condition at the time an actual engine load is detected in the non-referential state, based on a plurality of detection values of the engine load values memorized in the referential state.

An abnormality judging means M7 compares the estimated engine load calculated by the estimating means M6 with a corrected actual engine load which is detected in the non-referential state and corrected in accordance with a resultant change of the throttle valve opening degree, thereby making a judgement as to whether the exhaust gas recirculating operation is normal or abnormal.

An auxiliary air supply means M10 supplies auxiliary air so as to change the air amount introduced into the combustion chamber of the engine. A prohibiting means M11 prohibits the abnormality judgement by the abnormality judging means M7.

An open degree adjusting means M12 determines a target opening degree of the open/close means M1 in accordance with operational conditions of the internal combustion engine.

An open degree restricting means M13 restricts the operation of the open/close control means M5 so as to prevent the opening degree of the open/close means M1 from being excessively changed during execution of an abnormality judgement.

As well as the first and second embodiments, the third embodiment is embodied in the exhaust gas recirculation system applied to the internal combustion engine shown in FIG. 3.

Figure 19:
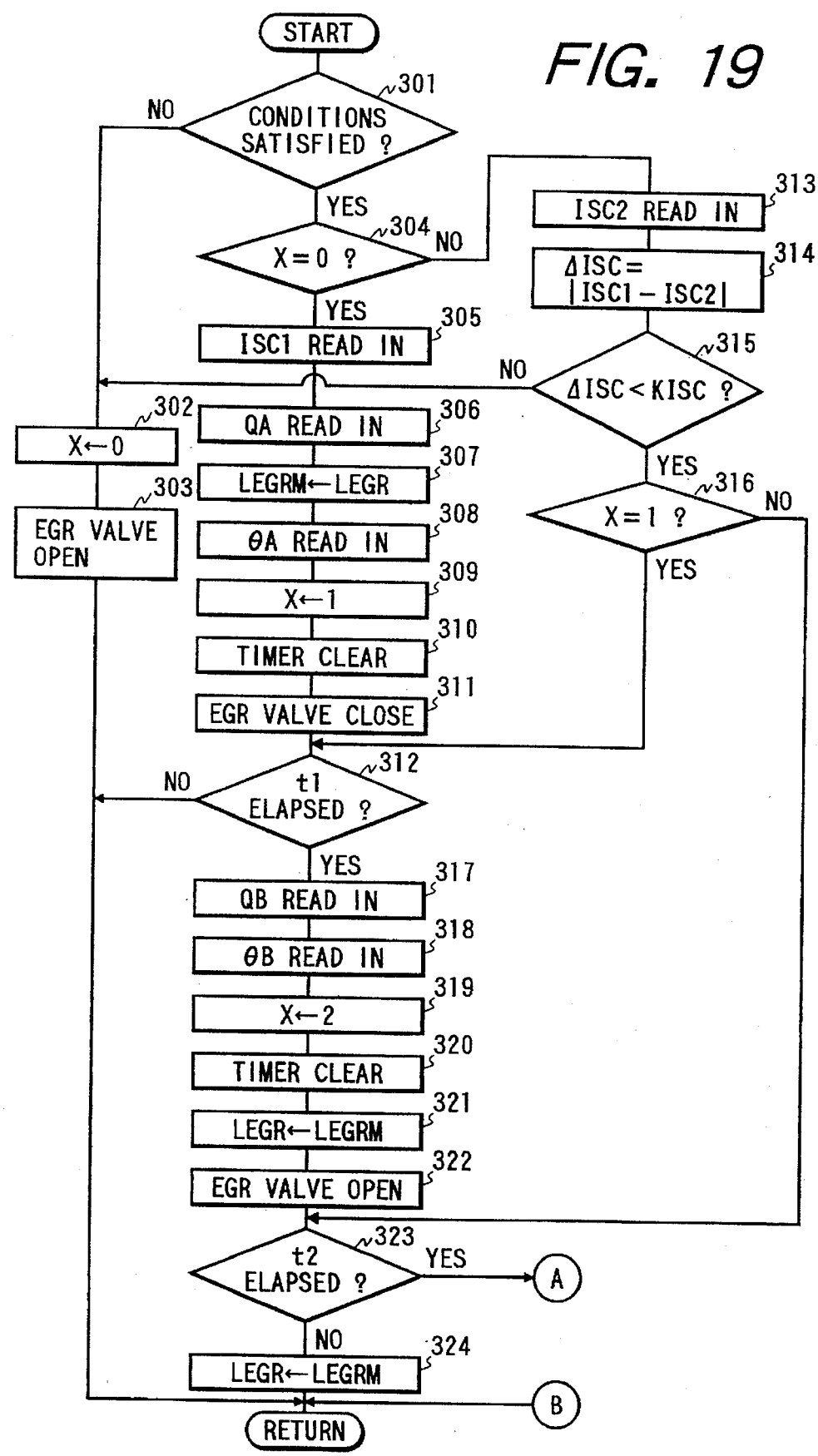
FIGS. 19 and 20 are flow charts showing an EGR abnormality judging routine in accordance with the third embodiment of the present invention.
Figure 20:
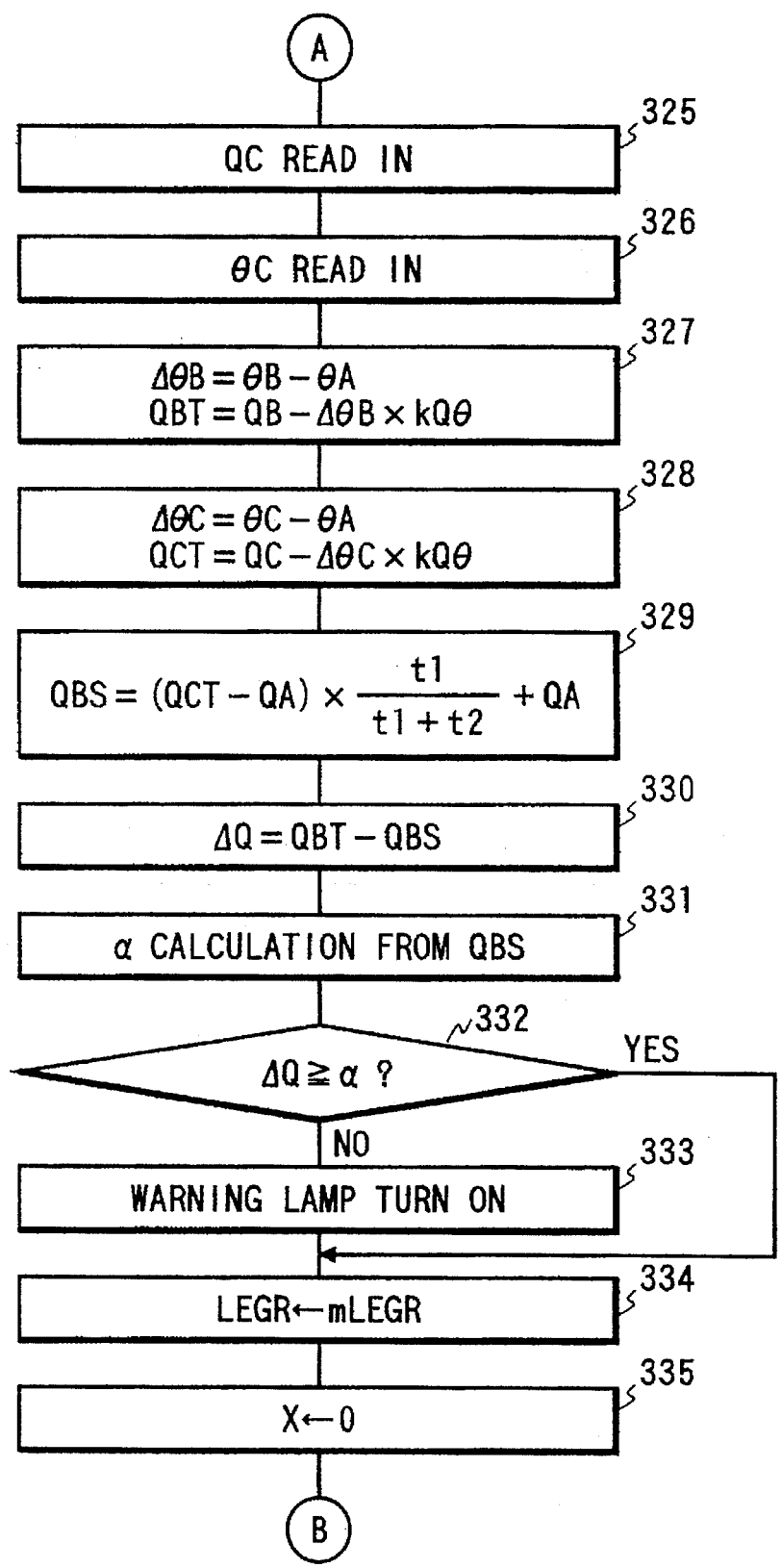
Figure 21:
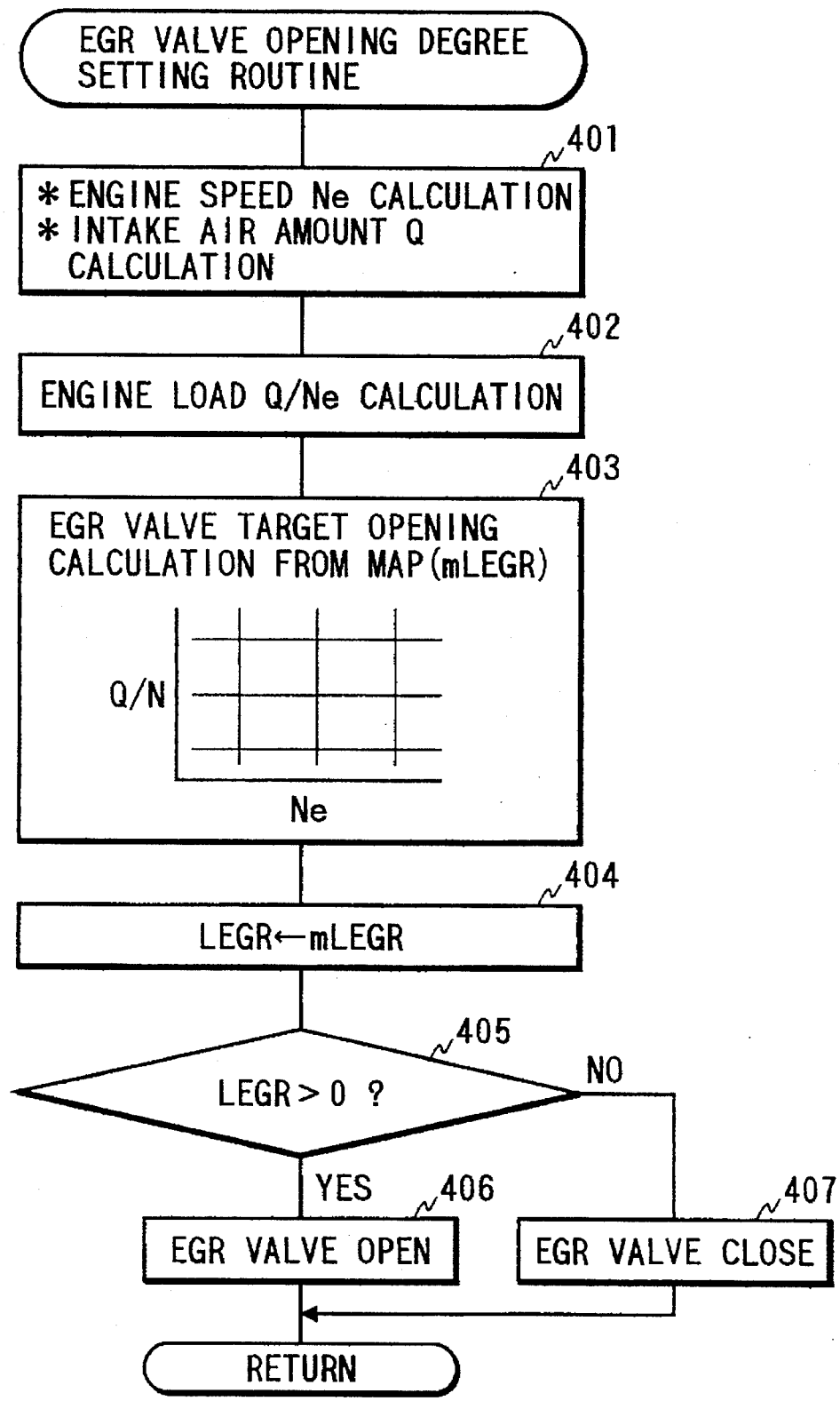
FIG. 21 is a flow chart showing an EGR valve opening degree setting routine in accordance with the third embodiment of the present invention.

The third embodiment performs an EGR abnormality judging routine shown in FIGS. 19 through 21 during the operation the internal combustion engine 1. When the EGR abnormality judgement processing is started, the CPU of the control circuit 41 checks in step 301 whether or not the conditions for executing the abnormality judgement processing are satisfied. Details of the conditions for executing the abnormality processing are as follows:

the throttle opening degree θ is continuously maintained at a substantially constant degree for a predetermined period of time or more without rapid changes; and an execution of the EGR abnormality judgement is allowed by an EGR abnormality judgement permitting means (not shown).

The length of the above predetermined period of time is determined in view of a time required for an automotive vehicle to reach a constant accelerating condition. The EGR abnormality judgement permitting means allows the execution of the EGR abnormality judgement when any EGR abnormality judgement has not been yet executed since the internal combustion engine 1 has started its operation. This permission may be given repeatedly in response to each elapse of the predetermined time, or when the engine operating condition is in a specific condition.

The conditions for the abnormality judgement will not be established when the automotive vehicle is cruising at a constant speed or immediately after the automotive vehicle starts acceleration. Thus, when the judgement of the step becomes "NO", the CPU proceeds to step 302 to reset the flag counter "X" to "0". This flag counter "X" is used when an intake air amount QA later described is read in. In the next step 303, the EGR valve 25 is opened and then the CPU completes the processing of the present cycle. Thereafter, the opening degree of EGR valve 25 is controlled to be a predetermined value in accordance with the operating condition of the internal combustion engine 1.

When the automotive vehicle enters into a constant accelerating condition, the conditions for the abnormality judgement will be established. Thus, the CPU proceeds from step 301 to step 304 wherein the CPU judges whether or not the flag counter "X" is "0". If the CPU already passed the step 302 in the previous cycle, the flag counter "X" will be already set to "0". Thus, the CPU proceeds to step 305 wherein a control amount of the ISC valve 51, i.e. a momentary bypass air amount, is read in and memorized as bypass air amount "ISC1". At the same time (at the time (1) in FIG. 17), the CPU performs the procedure of steps 306, 307 and 306. A momentary intake air amount Q detected by the air flow meter 30 is read in and memorized as intake air amount QA (step 308). An EGR valve target opening degree "LEGR", calculated in accordance with the operating condition of the internal combustion engine 1 using the EGR valve opening degree setting routine shown in FIG. 21, is memorized as a judgement initial opening degree "LEGRM" (step 307). A momentary throttle opening degree θ detected by the throttle valve opening sensor 31 is read in and memorized as θA (step 308).

Subsequently, the CPU sets the flag counter "X" to "1" in step 309, and clears a timer in step 310. This timer is used to count up a predetermined time "t1". Then, the EGR valve 25 is closed (at the time (2) in step 311. Next, the CPU makes a judgement in step 312 as to whether or not the predetermined time "t1 (e.g. 500 msec)" has already elapsed since the time (1) when the value "QA" was read in. If the predetermined time "t1" has not yet elapsed, the judgement result of the step 312 becomes "NO" and therefore the CPU completes the processing of the present cycle. As the flag counter "X" is already set to "1" for the next processing, CPU proceeds from step 304 to step 313.

In the step 313, a control amount of the ISC valve 51, i.e. a momentary bypass air amount, is read in and memorized as bypass air amount "ISC2". Subsequently, in step 314, the CPU obtains an absolute difference ΔISC between the bypass air control amount ISC1 read in the step 305 and the bypass air control amount ISC2 read in the step 313 (i.e. ΔISC=|ISC1−ISC2|). Then, in step 315, the CPU compares the resultant difference θISC with a predetermined value KISC. The predetermined value KISC is a criterion to judge whether or not the EGR abnormality judgement is accurately performed. For example, the constant KISC has a practical value equivalent to a control amount change of the ISC valve 51 causing a half intake air amount change of the abnormality judgement level If the value ΔISC is not smaller than KISC, the CPU proceeds to the step 302 without performing any EGR abnormality judgement. Namely, the above-described steps 305, 313, 314 and 315 act as the abnormality judgement prohibiting means M11. If the value ΔISC is smaller than KISC, the CPU proceeds to step 316 wherein a judgement is made as to whether or not the flag counter "X" is set to "1". As the flag counter "X" is already set to "1" in the step 309, the CPU proceeds to the step 312. In this manner, a series of steps 301, 304, 312 and 316 provides a waiting time equivalent to the predetermined time "t1" after the time (1) when the value "QA" was read in.

If the predetermined waiting time "t1" has passed ("YES" in step 312), the CPU proceeds from step 312 to step 317 wherein a momentary intake air amount Q detected by the air flow meter 30 is read in and memorized as an intake air amount QB (at the timing (3) in FIG. 17). At the same time, the CPU performs the procedure of step 318 wherein a momentary throttle opening degree θ detected by the throttle valve opening sensor 31 is read in and memorized as θB.

Next, the CPU sets the flag counter "X" to "2" in step 319, and clears the timer in step 320. The timer is used to count up a predetermined time "t2". Furthermore, in step 321, the CPU substitutes the Value of "LEGRM" memorized in the step 307 for a target opening degree "LEGR". In other words, the target opening degree "LEGR" is forcibly fixed to the judgement initial opening degree "LEGRM" no matter how the operating condition of the internal combustion engine 1 is changed (for example, from the "H" region to the "L" region in FIG. 16). In this manner, the above-described step 321 acts as the open degree restricting means M13, as well as step 324 described below. Subsequently, in step 322, the EGR valve 25 is opened again at the time (4).

Then, the CPU makes a judgement in step 323 as to whether or not the predetermined time "t2 (e.g. 500 msec)" has already elapsed since the time (3) when the value "QB" was read in. If the predetermined time "t2" has not yet elapsed, the judgement result of the step 323 becomes "NO" and the target opening degree "LEGR" is forcibly fixed to the judgement initial opening degree "LEGRM" in step 324. After that, the CPU completes the processing of the present cycle.

As the flag counter "X" is already set to "2" for the next processing, the CPU proceeds from step 304 to step 316 and to step 323. In this manner, a series of steps 301, 304 312, 316 and 323 provides a waiting time equivalent to the predetermined time "t2" after the time (3) when the value "QB" was read in.

If the predetermined waiting time "t2" has passed ("YES" in step 323), the CPU proceeds from step 323 to step 325 wherein a momentary intake air amount Q detected by the air flow meter 30 is read in and memorized as an intake air amount QC (at the time (5) in FIG. 17). At the same time, the CPU performs the procedure of step 326 wherein a momentary throttle opening degree θ detected by the throttle valve opening sensor 31 is read in and memorized as Next, in step 327, the CPU corrects the throttle valve opening degree θB in the following manner. First, the CPU obtains a difference ΔθB by subtracting the throttle valve opening degree θB at, the timing (3) detected in the step 318 by the throttle valve opening degree θA at the timing (1) detected in the step 308 (i.e. ΔθB =θB−θA). Then, the CPU calculates an estimated intake air amount "QBT" which should be obtained when the throttle valve opening degree θB detected at the timing (3) is the same as the throttle valve opening degree θA at the timing (1), using the following equation based on thus obtained ΔθB.

$$QBT = QB - \Delta\theta B \times kQ\theta \quad (10)$$

where kQθ is a coefficient for converting the unit throttle valve opening change into an equivalent intake air amount change; the practical value of coefficient kQθ is, for example, 1.5 g/sec/deg which should be determined in accordance with engine operational conditions.

Next, in step 328, the CPU obtains a difference ΔθC by subtracting the throttle valve opening degree θC at the timing (5) detected in the step 326 by the throttle valve opening degree θA at the timing (1) detected in the step 308 (i.e. ΔθC=θC−θA). Then, the CPU calculates an estimated intake air amount "QCT" which should be obtained when the throttle valve opening degree θC detected at the time (5) is the same as the throttle valve opening degree θA at the timing (1), using the following equation based on thus obtained ΔθC.

$$QCT = QC - \Delta\theta C \times kQ\theta \qquad (11)$$

Next, the CPU judges whether or not the engine is operated in a constant accelerating condition. To this end, in step 329, the CPU obtains an imaginal intake air amount "QBS" as an air intake amount to be obtained at the time (3) under the constant accelerating condition, based on the intake air amounts "QA" and "QCT" already obtained in the steps 306 and 328, using the following equation.

$$QBS = (QCT - QA) \cdot t1/(t1 + t2) + QA \qquad (12)$$

More specifically, the intake air amount Q smoothly increases along an ascendant straight line whenever the internal combustion engine 1 is operated in a constant accelerating condition. Based on this fact, the imaginal intake air amount "QBS", corresponding to the time (3), can be interpolated along the straight line passing both the intake air amounts "QA" and "QCT". Thus, the CPU (having the function of step 329) acts as the estimating means M6.

Thereafter, in step 330, the CPU obtains a variation ΔQ by subtracting the estimated intake air amount "QBS" from the corrected intake air amount "QBT" corresponding to the time (3) measured in the step 327. (i.e. ΔQ=QBT−QBS)

In short, this variation ΔQ represents a change of intake air amount Q due to the closing of the EGR valve 25.

Figure 22:
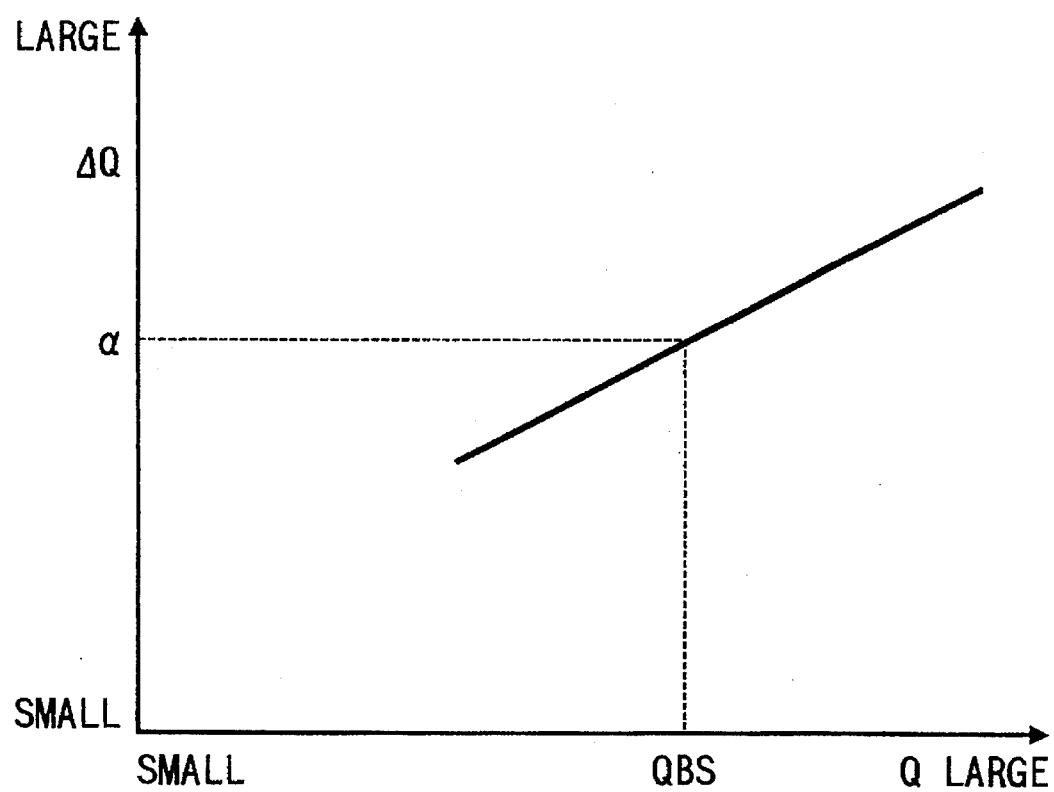
FIG. 22 is a graph showing a relationship between intake air amount "Q" and abnormality judgement level "α" in accordance with the third embodiment of the present invention.

Next, in step 331, the CPU obtains an abnormality judgement level "α" with reference to the map shown in FIG. 22. The variation ΔQ of the intake air amount Q due to the closing of the EGR valve 25 is proportional to the intake air amount Q. Thus, the EGR system 46, when it operates normally, shows a linear relationship shown in FIG. 22. Thus, in the step 331, the CPU obtains a variation ΔQ corresponding to the estimated intake air amount "QBS" as the abnormal judgement level "α".

Next, in step 332, the CPU makes a judgement as to whether or not the variation ΔQ is not smaller than the abnormality judgement level "α". When the variation ΔQ is not smaller than the abnormality judgement level "α", the CPU judges that the EGR system 48 is operated normally and then goes to step 334. On the other hand, when the variation ΔQ is smaller than the abnormality judgement level "α", the CPU judges that the EGR system 46 malfunctions and then goes to step 333 wherein the warning lamp 47 is turned on to notify the abnormality of the EGR system 46, then going to the step 334.

In the step 334, the CPU releases the restriction of the EGR valve target opening degree "LEGR"; therefore, the EGR valve target opening degree "LEGR" is no longer fixed to a constant value of "LEGRM". More specifically, the CPU calculates an ordinary EGR valve target opening degree mLEGR based on the engine operational conditions through the EGR valve opening degree setting routine shown in FIG. 21. Thereafter, in step 335, the CPU sets the flag counter "X" to "0" and completes the processing of EGR abnormality judgement. After that, the opening degree of EGR valve 25 is precisely adjusted to a predetermined value to perform an ordinary EGR control in accordance with operating conditions of the internal combustion engine 1. The above-described steps 330 through 332 act as the abnormality judging means M7.

By the way, once the abnormality judgement of EGR system 46 is completed, the above-described EGR abnormality judgement permitting means (not shown) prohibits the execution of the abnormality judgement until the predetermined permitting conditions are satisfied again. Thus, the judgement of the step 301 becomes "NO", allowing execution of the steps 301 through 303 only.

The EGR valve opening degree setting routine will be next explained with reference to FIG. 21.

This routine is repetitively executed during operation of the internal combustion engine, for determining an open degree of the EGR valve 25 for the ordinary EGR control.

First, in step 401, the CPU calculates an engine speed Ne based on signals obtained from the crank angle sensor 39 and also calculates an intake air amount Q based on a signal obtained from the air flow meter 30. Then, in step 402, the CPU calculates an engine load by dividing the intake air amount Q by the engine speed Ne (i.e. engine load=Q/Ne).

Subsequently, in step 403, the CPU looks up a target opening degree for the EGR valve 25 with reference to a map whose values are specified by the two-dimensional factors of engine speed Ne and engine load Q/Ne, thereby obtaining an optimum EGR valve opening degree "mLEGR" in accordance with the present engine operating conditions. Then, in step 404, the CPU substitutes thus obtained EGR valve opening degree "mLEGR" for the EGR valve target opening degree "LEGR". Thus, the CPU (having the function of above-described steps 401 through 404) acts as the open degree adjusting means M12 of the present invention.

After that, in step 405, the CPU makes a judgement as to whether or not the EGR valve target opening degree "LEGR" is larger than "0 (=complete closed condition)". If the target opening degree "LEGR" is larger than "0", the CPU proceeds to step 406 to adjust the actual opening degree of the EGR valve 25 to the target opening degree "LEGR". Then, the CPU completes the EGR valve opening degree setting routine. If the target opening degree "LEGR" is "0", the CPU proceeds to step 407 to completely close the EGR valve 25 and then ends this routine.

According to the above-described third embodiment, the control of the opening degree of the EGR valve 25 is restricted during the abnormality judgement no matter how the engine operating condition is changed (for example, from the "H" region to the "L" region in FIG. 16), so that the abnormality judgement is not erroneously performed (without causing an excessive change of the opening degree of the EGR valve 25 during the abnormality judgement). Thus, the EGR abnormality judgement will be accurately performed and the emission can be prevented from getting worse.

Although the above-described third embodiment fixes the EGR valve 25 at a constant opening degree during the abnormality judgement, it is needless to say that the EGR valve 25 may be allowed to slightly vary its opening degree during the abnormality judgement as long as such a change may not give an adverse effect to the result of abnormality judgement.

Furthermore, the above-described third embodiment adopts the correction of intake air amount "Q" in response to a resultant change of the throttle valve opening. Adopting such correction is useful and effective to perform the abnormality judgement even if the engine operational condition is slightly changed, thus realizing an earlier completion of the EGR abnormality judgement. Furthermore, the above-described third embodiment always monitors the change of the control amount of ISC valve 51 during the EGR abnormality judgement, so that the EGR abnormality judgement is prohibited when the auxiliary air supply amount is excessively changed. Thus, the EGR abnormality judgement is no longer bothered by an adverse effect derived from the change of auxiliary air, and thus can be performed accurately.

Although the above-described third embodiment detects the intake air amounts "QA","QB" and "QC" as engine load, it is well known that the intake air amount has a close correlation with intake air pressure. Thus, it is needless to say that the detection of intake air amount is equivalent to the detection of intake air pressure. In this respect, the intake air pressure sensor 80 is provided in the intake passage S at the downstream portion of the throttle valve 27. In this case, the constant $kQ\theta$ used in the steps 327 and 328 is replaced by a constant $kP\theta$. The constant $kP\theta$ is a coefficient for converting the unit throttle valve opening change into an equivalent intake air pressure change. To increase accuracy in the correction of engine load (i.e. intake air amount, or intake air pressure, or equivalent thereof) during the EGR abnormality judgement, it is desirable that the coefficients $kQ\theta$ and $kP\theta$, employed in the third embodiment, are set as table data variable in accordance with the engine operating conditions.

Furthermore, the throttle valve opening is closely correlated with an accelerator pedal angle. Thus, the detection of the throttle valve opening can be realized by detecting the accelerator pedal angle. In other words, it should be understood that the throttle valve opening detecting means M6 comprises an accelerator pedal angle sensor as well as the throttle valve opening sensor 31.

Furthermore, the EGR valve 25 is not limited to a vacuum-servo type which is actuated using a negative pressure in the intake passage 3, and therefore can be any other type, for example, actuated by a step motor or the like.

Although the above-described third embodiment prohibits the EGR abnormality judgement when the control amount change of the ISC valve 51 exceeds the predetermined value KISC, it is alternatively desirable that the control of the ISC valve 51 is restricted during the EGR abnormality judgement by completely prohibiting the change of the ISC valve 51 or suppressing the change within a predetermined range.

Fourth Embodiment

The fourth embodiment of the present invention is a modification of the above-described second embodiment. An accuracy of correcting the intake air amount "QB" and "QC" in response to the momentary change of the throttle valve opening degree will be deteriorated with increasing change of the throttle valve opening degree.

Figure 23:
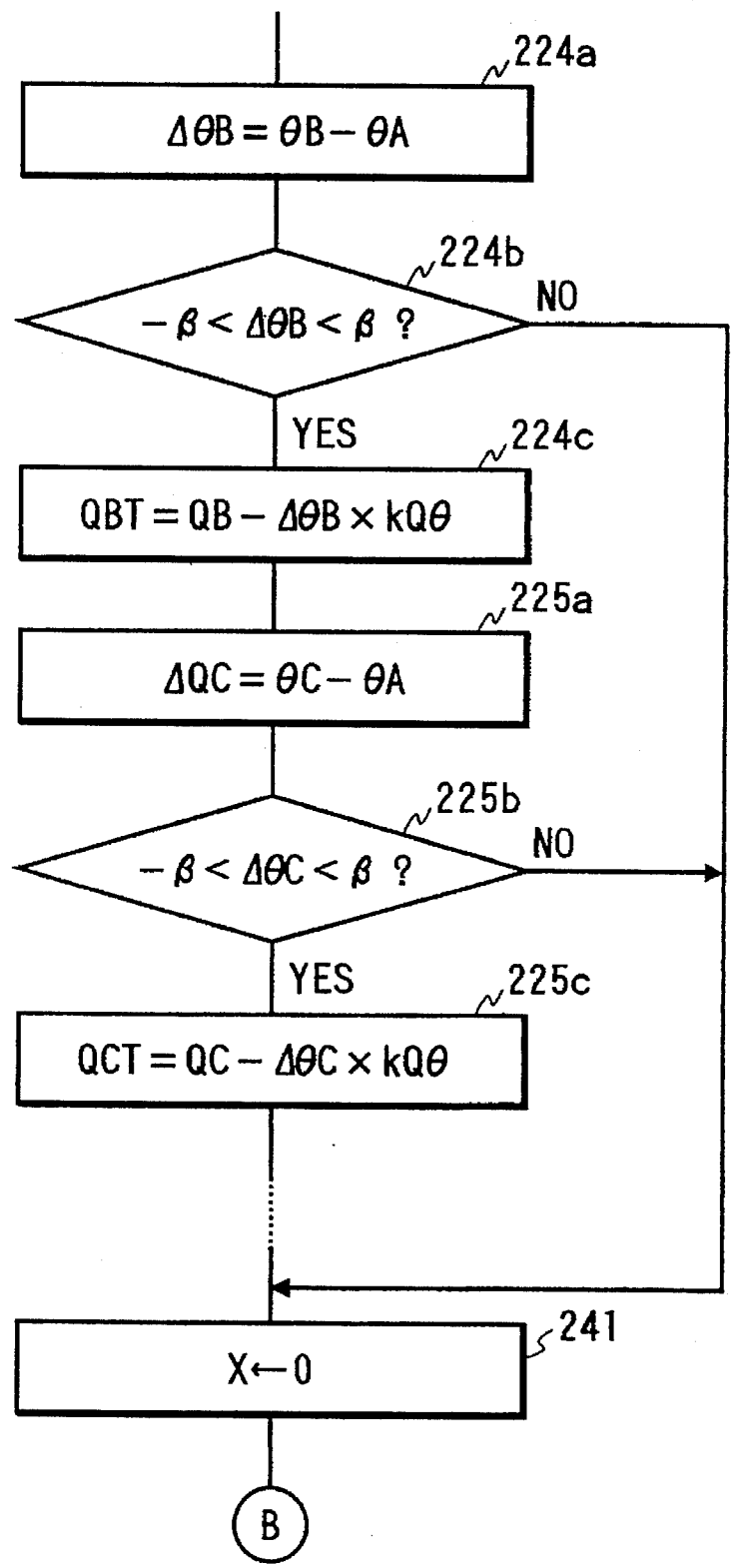
FIG. 23 is a flow chart showing a part of an EGR abnormality judging routine in accordance with the fourth embodiment of the present invention.

To solve this problem, the fourth embodiment of the present invention replaces the procedure of steps 224 and 225 by steps 224a–224c and 225a–225c as shown in FIG. 23, so that the abnormality judgement is prohibited when the change of the throttle valve opening exceeds a predetermined threshold.

More specifically, in step 224a, the CPU obtains the difference $\Delta\theta B$ by subtracting the throttle valve opening degree $\theta B$ detected in the step 212 by the throttle valve opening degree $\theta A$ detected in the step 207 (i.e. $\Delta\theta B=\theta B-\theta A$). Then, in step 224b, the CPU makes a judgement whether or not thus calculated difference $\Delta\theta B$ is within a predetermined range (i.e. $-\beta<\Delta\theta B<-\beta$). If the judgement result of step 224b is "NO", the CPU proceeds to the step 241 (to set the counter flag "X" to "0"); namely, the abnormality judgement is prohibited. If the judgement result of step 224b is "YES (i.e. $-\beta<\Delta\theta B<-\beta$)", the CPU proceeds to step 224c wherein the CPU calculates an estimated intake air amount "QBT" which should be obtained when the throttle valve opening degree $\theta B$ detected at the timing (2) is the same as the throttle valve opening degree $\theta A$ at the timing (1), using the above-described equation (4). (i.e. QBT=QB–$\Delta\theta B\times kQ\theta$)

Next, in step 225a, the CPU obtains the difference $\Delta\theta C$ by subtracting the throttle valve opening degree $\theta C$ detected in the step 222 by the throttle valve opening degree $\theta A$ detected in the step 207 (i.e. $\Delta\theta C=\theta C-\theta A$). Then, in step 225b, the CPU makes a judgement whether or not thus calculated difference $\Delta\theta C$ is within a predetermined range (i.e. $-\beta<\Delta\theta C<-\beta$). If the judgement result of step 225b is "NO", the CPU proceeds to the step 241 (to set the counter flag "X" to "0"); namely, the abnormality judgement is prohibited. If the judgement result of step 225b is "YES (i.e. $-\beta<\Delta\theta C<-\beta$)", the CPU proceeds to step 225c wherein the CPU calculates an estimated intake air amount "QCT" which should be obtained when the throttle valve opening degree $\theta C$ detected at the timing (3) is the same as the throttle valve opening degree $\theta A$ at the timing (1), using the above-described equation (5). (i.e. QCT=QC–$\Delta\theta C\times kQ\theta$)

According to the fourth embodiment, in addition to the effect of the second embodiment, it brings the merit that the accuracy of the abnormality judgement is adequately prevented from being deteriorated due to the excessive change of the throttle valve opening degree.

Fifth Embodiment

The fifth embodiment of the present invention is a modification of the above-described third embodiment. The third embodiment chiefly intends to prevent the opening degree of EGR valve 25 from being excessively decreased (e.g. from the "H" region to the "L" region in FIG. 16) during the abnormality judgement. However, the present invention does not intends to suppress the increase of the opening degree of EGR valve 25 during the abnormality judgement, because the difference $\Delta Q$ between the intake air amount "QB" and the estimated intake air amount "QBS" detected at the time (3) will be sufficiently large to accurately perform the abnormality judgement when the opening degree of EGR valve is increased.

Figure 24:
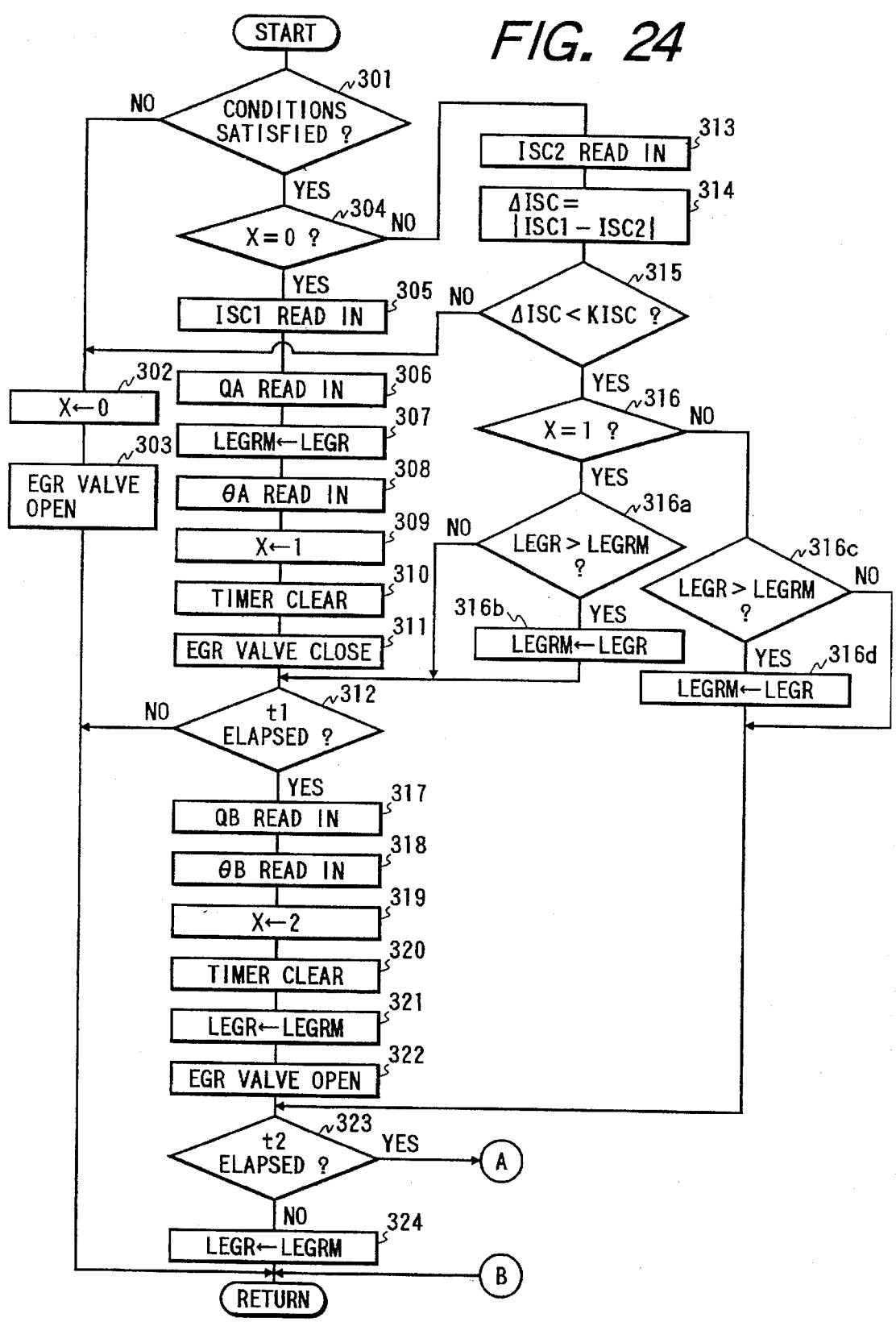
FIG. 24 is a flow chart showing a part of an EGR abnormality judging routine in accordance with the fifth embodiment of the present invention.

To realize this, the fifth embodiment of the present invention modifies the third embodiment as shown in FIG. 24, wherein steps 318a through 318d are newly added after the step 316 of the flow chart of FIG. 19.

According to the fifth embodiment, when the judgement result of step 316 is "YES", the CPU proceeds to step 316a wherein a judgement is made as to whether or not the present target opening degree "LEGR" is larger than the judgement initial opening degree "LEGRM". if the judgement result of step 316a is "YES" (i.e. LEGR >LEGRM), the CPU proceeds to step 316b wherein the presently adopted judgement initial opening degree "LEGRM" is renewed by the newly obtained target opening degree "LEGR", then going to the step 312.

Similarly, when the judgement result of step 316 is "NO", the CPU proceeds to step 316c wherein a judgement is made as to whether or not the present target opening degree "LEGR" is larger than the judgement initial opening degree "LEGRM". if the judgement result of step 316c is "YES" (i.e. LEGR>LEGRM), the CPU proceeds to step 316d wherein the presently adopted judgement initial opening degree "LEGRM" is renewed by the newly obtained target opening degree "LEGR", then going to the step 323.

With the function of these added steps 316a through 316d, the target opening degree "LEGR" newly obtained from the EGR valve opening degree setting routine of FIG. 21 is substituted for the presently adopted judgement initial opening degree "LEGRM", if thus obtained "LEGR" is larger than the "LEGRM". In other words, the fifth embodiment permits the EGR valve 25 to increase its opening degree during the execution of the abnormality judgement routine, because the value of "LEGRM" is renewed by a newly obtained target opening degree "LEGR" during the abnormality judgement whenever the newly obtained target opening degree "LEGR" exceeds the judgement initial opening degree "LEGRM".

According to the fifth embodiment, the EGR rate is controlled precisely during the execution of the EGR abnormality judgement unless the change of the EGR valve opening degree deteriorates the accuracy of the abnormality judgement. Thus, the emission can be prevented from getting worse.

Sixth Embodiment

Figure 25:
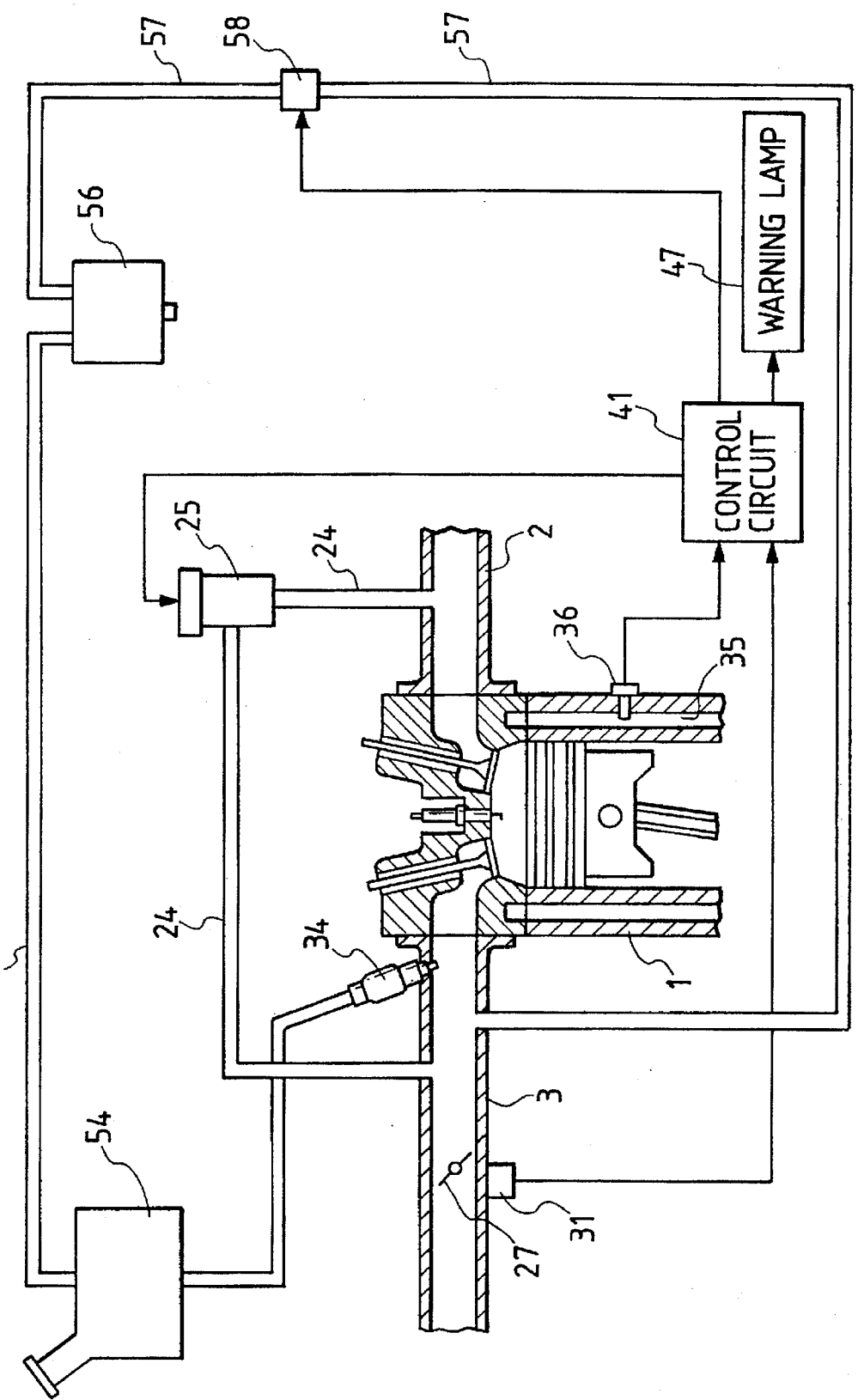
FIG. 25 is a schematic view showing an overall arrangement of the EGR system employed in the internal combustion engine in accordance with a sixth embodiment of the present invention.

FIG. 25 is a schematic view showing an evaporated fuel recirculation system in accordance with the sixth embodiment of the present invention. As explained in the second embodiment, recirculation of evaporated fuel into the intake passage is one of the factors changing the amount of auxiliary air introduced into the combustion chamber.

More specifically, the gas containing evaporated fuel is supplied from a fuel tank 54 through a passage 55 to a canister 56 and absorbed therein. An evaporated fuel gas relief valve 58 is provided in a downstream passage 57 of the canister 56. This evaporated fuel gas relief valve 58 is controlled in accordance with operating conditions of the internal combustion engine 1, so that the evaporated fuel gas is discharged adequately from the canister 56 to the intake passage 3.

According to the sixth embodiment, the abnormality judgement is prohibited when the control amount of the evaporated fuel gas relief valve 58 is increased to a predetermined value.

Alternatively, it is possible to suppress the control amount of the evaporated fuel gas relief valve 58 from being excessively changed during the execution of abnormality judgement. For example, it is desirable to fix the control amount of evaporated fuel gas relief valve 58 at a constant value, or to suppress the change of the control amount within a predetermined range.

In this embodiment, it will be desirable that the EGR valve 25 is controlled by a step motor or a solenoid.

Seventh Embodiment

Figure 26:
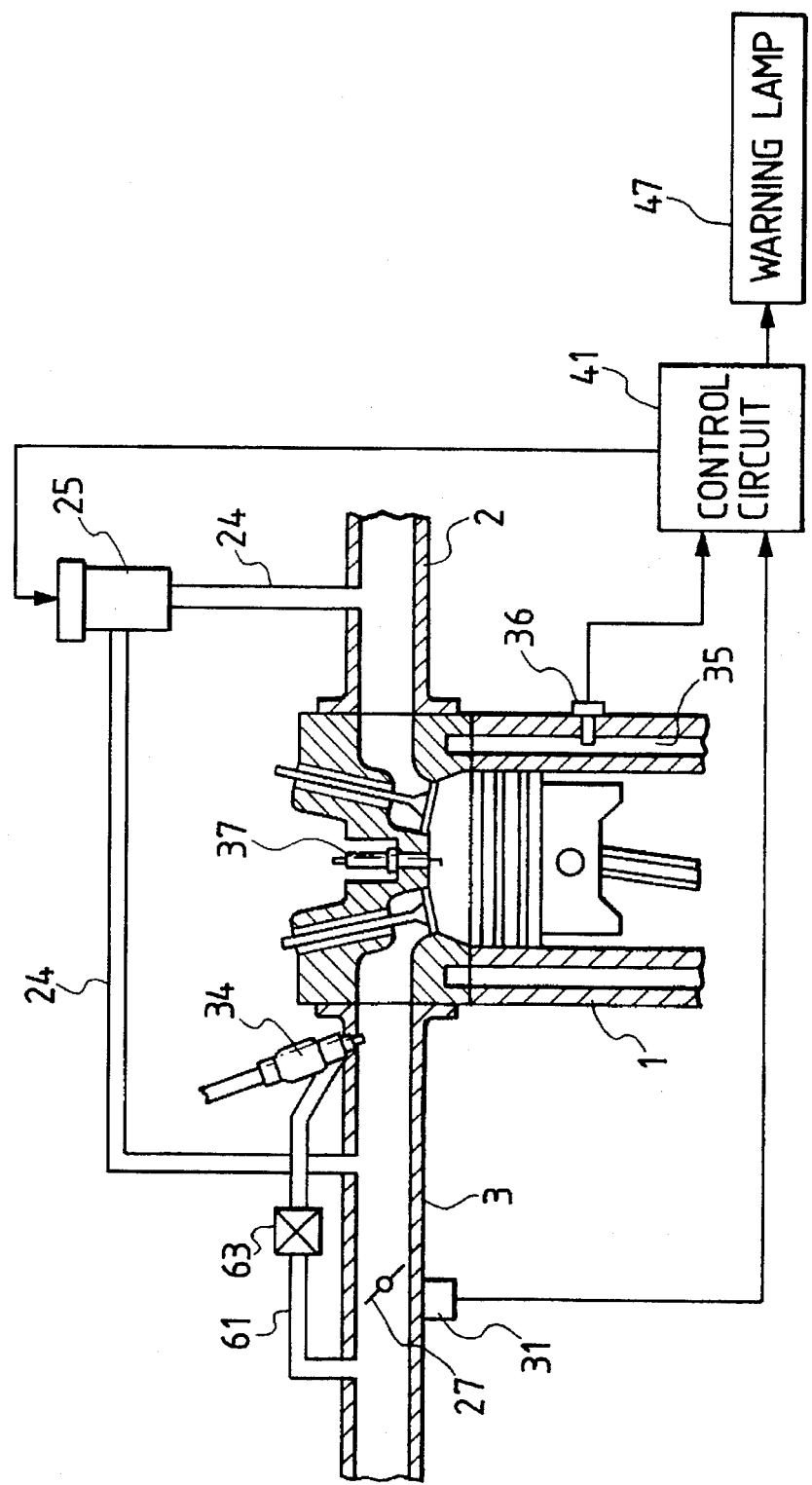
FIG. 26 is a schematic view showing an overall arrangement of the EGR system employed in the internal combustion engine in accordance with a seventh embodiment of the present invention.

FIG. 26 is a schematic view showing an assist air supply system in accordance with the seventh embodiment of the present invention. As explained in the second embodiment, an assist air system is provided to adequately atomize the fuel injected from the fuel injector 34. The suppliance of assist air is one of the factors changing the amount of auxiliary air introduced into the combustion chamber.

More specifically, there is provided an assist air supply passage 61 connecting the upstream portion and the downstream portion of the throttle valve 27, with an assist air amount control valve 63 provided in the assist air supply passage 61. The downstream outlet of the assist air passage 61 is connected closely to the fuel injector 34. The assist air amount control valve 63 is controlled in accordance with operating conditions of the internal combustion engine 1, so that the injected fuel is adequately atomized.

According to the seventh embodiment, the abnormality judgement is prohibited when the control amount of the assist air amount control valve 63 is increased to a predetermined value.

Alternatively, it is possible to suppress the control amount of the assist air amount control valve 63 from being excessively changed during the execution of abnormality judgement. For example, it is desirable to fix the control amount of the assist air amount control valve 63 at a constant value, or to suppress the change of the control amount within a predetermined range.

Miscellaneous

The warning lamp 47 acting as a warning means of the EGR system 46 can be replaced by a buzzer or anything else having a function of warning.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An exhaust gas recirculation system comprising:

open/close means for opening and closing an exhaust gas recirculation passage recirculating a part of exhaust gas of an internal combustion engine from an exhaust passage to an intake passage;

intake air amount detecting means for detecting an amount of intake air introduced into the internal combustion engine;

memory means for memorizing intake air amounts at a referential state and a non-referential state of said open/close means based on detection signals obtained from said intake air amount detecting means, said referential state being either an open condition or a closed condition of said open/close means while said non-referential state being the other;

constant acceleration judging means for judging whether or not said internal combustion engine is operated in a constant accelerating condition;

open/close control means for switching said open/close means from said referential state to said non-referential state when a constant accelerating condition is detected by said constant acceleration judging means;

estimating means for calculating an estimated intake air amount to be measured if said open/close means is maintained at said referential state under said constant accelerating condition at a time an actual intake air amount is detected in the non-referential state, based on a plurality of detection values of said intake air amounts in the referential state memorized by said memory means; and abnormality judging means for comparing said estimated intake air amount calculated by said estimating means with said actual intake air amount detected by said intake air amount detecting means in said non-referential state, thereby making a judgement as to whether an exhaust gas recirculating operation is normal or abnormal.

2. The exhaust gas recirculation system defined by claim 1, wherein intake air amounts are successively detected by said intake air amount detecting means and memorized by said memory means, and said constant acceleration judging means repeats a judgement for detecting said constant accelerating condition based on said successively detected intake air amounts until any constant accelerating condition is detected.

3. The exhaust gas recirculation system defined by claim 1, further comprising:

throttle valve opening detecting means for detecting a throttle valve opening degree of said internal combustion engine every time said intake air amount detecting means detects an intake air amount; and intake air amount correcting means for correcting the intake air amount detected by said intake air amount detecting means in accordance with a resultant change of said throttle valve opening degree detected by said throttle valve opening detecting means, so as to compensate for the resultant change of said throttle valve opening degree.

4. The exhaust gas recirculation system defined by claim 3, wherein the abnormality judgement by said abnormality judging means is prohibited when said resultant change of said throttle valve opening degree exceeds a predetermined value.

5. The exhaust gas recirculation system defined by claim 1, further comprising:

auxiliary air supply means for supplying auxiliary air into the internal combustion engine through an auxiliary air passage independent of a throttle valve of said internal combustion engine; and abnormality judgement prohibiting means for prohibiting the abnormality judgement by said abnormality judging means when a change amount of said auxiliary air exceeds a predetermined amount.

6. The exhaust gas recirculation system defined by claim 1, further comprising:

auxiliary air supply means for supplying auxiliary air into the internal combustion engine through an auxiliary air passage independent of a throttle valve of said internal combustion engine; and restricting means for restricting said auxiliary air supply means from changing a supply amount of auxiliary air when said abnormality judgement means performs the abnormality judgement.

7. An exhaust gas recirculation system comprising:

open/close means for opening and closing an exhaust gas recirculation passage recirculating a part of exhaust gas of an internal combustion engine from an exhaust passage to an intake passage;

intake air pressure detecting means for detecting a pressure of an intake air introduced into the internal combustion engine;

memory means for memorizing intake air pressures at a referential state and a non-referential state of said open/close means based on detection signals obtained from said intake air pressure detecting means, said referential state being either an open condition or a closed condition of said open/close means while said non-referential state being the other;

constant acceleration judging means for judging whether or not said internal combustion engine is operated in a constant accelerating condition;

open/close control means for switching said open/close means from said referential state to said non-referential state when a constant accelerating condition is detected by said constant acceleration judging means;

estimating means for calculating an estimated intake air pressure to be measured if said open/close means is maintained at said referential state under said constant accelerating condition at a time an actual intake air pressure is detected in the non-referential state, based on a plurality of detection values of said intake air pressures in the referential state memorized by said memory means; and abnormality judging means for comparing said estimated intake air pressure calculated by said estimating means with said actual intake air pressure detected by said intake air pressure detecting means in said non-referential state, thereby making a judgement as to whether an exhaust gas recirculating operation is normal or abnormal.

8. The exhaust gas recirculation system defined by claim 7, wherein intake air pressures are successively detected by said intake air pressure detecting means and memorized by said memory means, and said constant acceleration judging means repeats a judgement for detecting said constant accelerating condition based on said successively detected intake air pressures until any constant accelerating condition is detected.

9. The exhaust gas recirculation system defined by claim 1, further comprising:

throttle valve opening detecting means for detecting a throttle valve opening degree of said internal combustion engine every time said intake air pressure detecting means detects an intake air pressure; and intake air pressure correcting means for correcting the intake air pressure detected by said intake air pressure detecting means in accordance with a resultant change of said throttle valve opening degree detected by said throttle valve opening detecting means, so as to compensate for the resultant change of said throttle valve opening degree.

10. The exhaust gas recirculation system defined by claim 9, wherein the abnormality judgement by said abnormality judging means is prohibited when said resultant change of said throttle valve opening degree exceeds a predetermined value.

11. The exhaust gas recirculation system defined by claim 7, further comprising:

auxiliary air supply means for supplying auxiliary air into the internal combustion engine through an auxiliary air passage independent of a throttle valve of said internal combustion engine; and abnormality judgement prohibiting means for prohibiting the abnormality judgement by said abnormality judging means when a change amount of said auxiliary air exceeds predetermined amount.

12. The exhaust gas recirculation system defined by claim 7, further comprising:

auxiliary air supply means for supplying auxiliary air into the internal combustion engine through an auxiliary air passage independent of a throttle valve of said internal combustion engine; and restricting means for restricting said auxiliary air supply means from changing a supply amount of auxiliary air when said abnormality judgement means performs the abnormality judgement.

13. An exhaust gas recirculation system comprising:

open/close means for opening and closing an exhaust gas recirculation passage recirculating a part of exhaust gas of an internal combustion engine from an exhaust passage to an intake passage;

intake air amount detecting means for detecting an amount of intake air introduced into the internal combustion engine;

throttle valve opening degree detecting means for detecting an opening degree of a throttle valve of said internal combustion engine;

memory means for memorizing intake air amounts and throttle valve opening degrees at a referential state and a non-reverential state of said open/close means based on detection signals obtained from said intake air amount detecting means and said throttle valve opening degree detecting means, said referential state being either an open condition or a closed condition of said open/close means while said non-referential state being the other;

intake air amount correcting means for correcting the intake air amount detected by said intake air amount detecting means in accordance with a resultant change of said throttle valve opening degree detected by said throttle valve opening degree detecting means, so as to compensate for the resultant change of said throttle valve opening degree;

estimating means for calculating an estimated intake air amount to be measured if said open/close means is maintained at said referential state under a constant valve opening degree of said throttle valve at a time an actual intake air amount is detected in said non-referential state, based on a plurality of detection values of said intake air amounts in the referential state corrected by said intake air amount correcting means; and abnormality judging means for comparing said estimated intake air amount calculated by said estimating means with the intake air amount corrected by said intake air amount correcting means in said non-referential state, thereby making a judgement as to whether an exhaust gas recirculating operation is normal or abnormal.

14. An exhaust gas recirculation system comprising:

open/close means for opening and closing an exhaust gas recirculation passage recirculating a part of exhaust gas of an internal combustion engine from an exhaust passage to an intake passage;

intake air pressure detecting means for detecting a pressure of intake air introduced into the internal combustion engine;

throttle valve opening degree detecting means for detecting an opening degree of a throttle valve of said internal combustion engine;

memory means for memorizing intake air pressures and throttle valve opening degrees at a referential state and a non-referential state of said open/close means based on detection signals obtained from said intake air pressure detecting means and said throttle valve opening degree detecting means, said referential state being either an open condition or a closed condition of said open/close means while said non-referential state being the other;

intake air pressure correcting means for correcting the intake air pressure detected by said intake air pressure detecting means in accordance with a resultant change of said throttle valve opening degree detected by said throttle valve opening degree detecting means, so as to compensate for the resultant change of said throttle valve opening degree;

estimating means for calculating an estimated intake air pressure to be measured if said open/close means is maintained at said referential state under a constant valve opening degree of said throttle valve at a time an actual intake air pressure is detected in said non-referential state, based on a plurality of detection values of said intake air pressures in the referential state corrected by said intake air pressure correcting means; and abnormality judging means for comparing said estimated intake air pressure calculated by said estimating means with the intake air pressure corrected by said intake air pressure correcting means in said non-referential state, thereby making a judgement as to whether an exhaust gas recirculating operation is normal or abnormal.

15. An exhaust gas recirculation system comprising:

open/close means for opening and closing an exhaust gas recirculation passage recirculating a part of exhaust gas of an internal combustion engine from an exhaust passage to an intake passage;

target opening degree setting means for setting a target opening degree of said open/close means in accordance with operating conditions of said internal combustion engine;

open/close control means for adjusting an opening degree of said open/close means in accordance with said target opening degree;

intake air amount detecting means for detecting an amount of intake air introduced into the internal combustion engine;

abnormality judging means for making a judgement as to whether an exhaust gas recirculating operation is normal or abnormal based on detection signals of said intake air amount detecting means by comparing an intake air amount detectable at a referential state of said open/close means with an intake air amount detectable at a non-referential state of said open/close means, said referential state being either an open condition or a closed condition of said open/close means while said non-referential state being the other; and open degree restricting means for restricting an operation of said open/close control means, so as to prevent the opening degree of the open/close means from being reduced during execution of the abnormality judgement by said abnormality judging means.

16. The exhaust gas recirculation system defined by claim 15, wherein said open degree restricting means allows said open/close control means to increase the opening degree of said open/close means in accordance with said target opening degree during the abnormality judgement by said abnormality judging means, when said target opening degree setting means; renewed said target opening degree to a larger value.

17. The exhaust gas recirculation system defined by claim 15, wherein said open degree restricting means fixes the opening degree of said open/close means at a constant value during the abnormality judgement by said abnormality judging means.

18. An exhaust gas recirculation system comprising:

open/close means for opening and closing an exhaust gas recirculation passage recirculating a part of exhaust gas of an internal combustion engine from an exhaust passage to an intake passage;

target opening degree setting means for setting a target opening degree of said open/close means in accordance with operating conditions of said internal combustion engine;

open/close control means for adjusting an opening degree of said open/close means in accordance with said target opening degree;

intake air pressure detecting means for detecting a pressure of intake air introduced into the internal combustion engine;

abnormality judging means for making a judgement as to whether an exhaust gas recirculating operation is normal abnormal based on detection signals of said intake air pressure detecting means by comparing an intake air pressure detectable at a referential state of said open/close means with an intake air pressure detectable at a non-referential state of said open/close means, said referential state being either an open condition or a closed condition of said open/close means while said non-referential state being the other; and open degree restricting means for restricting an operation of said open/close control means, so as to prevent the opening degree of the open/close means from being reduced during execution of the abnormality judgement by said abnormality judging means.

19. The exhaust gas recirculation system defined by claim 18, wherein said open degree restricting means allows said open/close control means to increase the opening degree of said open/close means in accordance with said target opening degree during the abnormality judgement by said abnormality judging means, when said target opening degree setting means renewed said target opening degree to a larger value.

20. The exhaust gas recirculation system defined by claim. 18, wherein said open degree restricting means fixes the opening degree of said open/close means at a constant value during the abnormality judgement by said abnormality judging means.

21. An exhaust gas recirculation system comprising:
auxiliary air supply means for supplying auxiliary air into an internal combustion engine through an auxiliary air passage independent of a throttle valve of said internal combustion engine;

open/close means for opening and closing an exhaust gas recirculation passage recirculating a part of exhaust gas of an internal combustion engine from an exhaust passage to an intake passage;

intake air amount detecting means for detecting an amount of intake air introduced into the internal combustion engine through said throttle valve;

abnormality judging means for making a judgement as to whether an exhaust gas recirculating operation is normal or abnormal based on detection signals of said intake air amount detecting means by comparing an intake air amount detectable at a referential state of said open/close means with an intake air amount detectable at a non-referential state of said open/close means, said referential state being either an open condition or a closed condition of said open/close means while said non-referential state being the other; and restricting means for restricting said auxiliary air supply means from changing a supply amount of auxiliary air when said abnormality judgement means performs the abnormality judgement.

22. An exhaust gas recirculation system comprising:
auxiliary air supply means for supplying auxiliary air into an internal combustion engine through an auxiliary air passage independent of a throttle valve of said internal combustion engine;

open/close means for opening and closing an exhaust gas recirculation passage recirculating a part of exhaust gas of an internal combustion engine from an exhaust passage to an intake passage;

intake air pressure detecting means for detecting a pressure of intake air introduced into the internal combustion engine through said throttle valve;

abnormality judging means for making a judgement as to whether an exhaust gas recirculating operation is normal or abnormal based on detection signals of said intake air pressure detecting means by comparing an intake air pressure detectable at a referential state of said open/close means with an intake air pressure detectable at a non-referential state of said open/close means, said referential state being either an open condition or a closed condition of said open/close means while said non-referential state being the other; and restricting means for restricting said auxiliary air supply means from changing a supply amount of auxiliary air when said abnormality judgement means performs the abnormality judgement.

23. An exhaust gas recirculation system comprising:
open/close means for opening and closing an exhaust gas recirculation passage recirculating exhaust gas of an internal combustion engine from an exhaust passage to an intake passage;

engine load detecting means for detecting an engine load of said internal combustion engine;

memory means comprising a referential state memory means and a non-referential state memory means, said referential state memory memorizing an engine load detected by said engine load detecting means when said open/close means is in a referential state while said non-referential state memory memorizing an engine load detected by said engine load detecting means when said open/close means is in a non-referential state, said referential state being either an open condition or a closed condition of said open/close means while said non-referential state being the other;

constant acceleration judging means for making a judgement as to whether or not an operational condition of said internal combustion engine is in a constant accelerating condition;

open/close control means for switching said open/close means from said referential state to said non-referential state in response to a constant accelerating condition detected by said constant acceleration judging means;

estimating means for calculating an estimated engine load to be measured if said open/close means is maintained at said referential state under a continuous constant accelerating condition at a time an actual engine load is detected in said non-referential state, based on a plurality of detection values of the engine load values memorized in the referential state; and abnormality judging means for comparing said estimated engine load calculated by said estimating means with said actual engine load detected in the non-referential state, thereby making a judgement as to whether an exhaust gas recirculating operation is normal or abnormal.

24. An exhaust gas recirculation system comprising:
open/close means for opening and closing an exhaust gas recirculation passage recirculating exhaust gas of an internal combustion engine from an exhaust passage to an intake passage;

engine load detecting means for detecting an engine load of the internal combustion engine;

throttle valve opening detecting means for detecting a valve opening degree of a throttle valve controlling an intake air amount to be introduced into the internal combustion engine;

memory means comprising a referential state memory means and a non-referential state memory means, said referential state memory memorizing an engine load detected by said engine load detecting means and a throttle opening degree detected by said throttle valve opening detecting means when said open/close means is in said referential state, while said non-referential state memory memorizing an engine load detected by said engine load detecting means and a throttle opening degree detected by said throttle valve opening detecting means when said open/close means is in said non-referential state, said referential state being either an open condition or a closed condition of said open/close means while said non-referential state being the other;

constant acceleration judging means for making a judgement as to whether or not the operational condition of said internal combustion engine is in a constant accelerating condition;

open/close control means for switching said open/close means from said referential state to said non-referential state in response to a constant accelerating condition. detected by said constant acceleration judging means;

engine load correcting means for correcting the engine load value detected by said engine load detecting means accordance with a resultant change of the throttle valve opening degree detected by said throttle valve opening detecting means;

estimating means for calculating an estimated engine load to be measured if said open/close means is maintained at said referential state under a constant valve opening degree said throttle valve at a time an actual engine load is detected in said non-referential state, based on a plurality of detection values of the engine load values memorized said referential state;

abnormality judging means for comparing said estimated. engine load calculated by said estimating means with corrected actual engine load which is detected in the non-referential state and corrected in accordance with a resultant change of said throttle valve opening degree, thereby making a judgement as to whether an exhaust gas recirculating operation is normal or abnormal;

auxiliary air supply means for supplying auxiliary air so as to increase a total amount of intake air introduced into the combustion chamber of the internal combustion engine; and prohibiting means for prohibiting the abnormality judgement by said abnormality judging means when a supply amount of said auxiliary air is changed.

25. An exhaust gas recirculation system comprising:

open/close means for opening and closing an exhaust gas recirculation passage recirculating exhaust gas of an internal combustion engine from an exhaust passage to an intake passage;

engine load detecting means for detecting an engine load of the internal combustion engine;

throttle valve opening detecting means for detecting a valve opening degree of a throttle valve controlling an intake air amount to be introduced into the internal combustion engine;

memory means comprising a referential state memory means and a non-referential state memory means, said referential state memory memorizing an engine load detected by said engine load detecting means and a throttle opening degree detected by said throttle valve opening detecting means when said open/close means is in a referential state, while said non-referential state memory memorizing an engine load detected by said engine load detecting means and a throttle opening degree detected by said throttle valve opening detecting means when said open/close means is in a non-referential state, said reverential state being either an open condition or a closed condition of said open/close means while said non-referential state being the other;

open/close control means for switching said open/close means from said referential state to said non-referential state;

engine load correcting means for correcting the engine load value detected by said engine load detecting means in accordance with a resultant change of the throttle valve opening degree detected by said throttle valve opening detecting means;

estimating means for calculating an estimated engine load to be measured if said open/close means is maintained at said referential state under a continuous constant accelerating condition at a time an actual engine load is detected in said non-referential state, based on a plurality of detection values of the engine load values memorized in said referential state;

abnormality judging means for comparing said estimated engine load calculated by said estimating means with a corrected actual engine load detected in said non-referential state and corrected in accordance with a resultant change of the throttle valve opening degree, thereby making a judgement as to whether an exhaust gas recirculating operation is normal or abnormal;

auxiliary air supply means for supplying auxiliary air so as to change a total air amount introduced into the internal combustion engine;

prohibiting means for prohibiting the abnormality judgement by said abnormality judging means when a supply amount of said auxiliary air is changed;

open degree adjusting means for determining a target opening degree of said open/close means in accordance with operational conditions of the internal combustion engine; and open degree restricting means for restricting an operation of said open/close control means so as to prevent the opening degree of said open/close means from being excessively changed during execution of an abnormality judgement.

* * * * *